INVENTORS
JACK D. NOBLE
WILLIAM FLEMING
BY
ATTY.

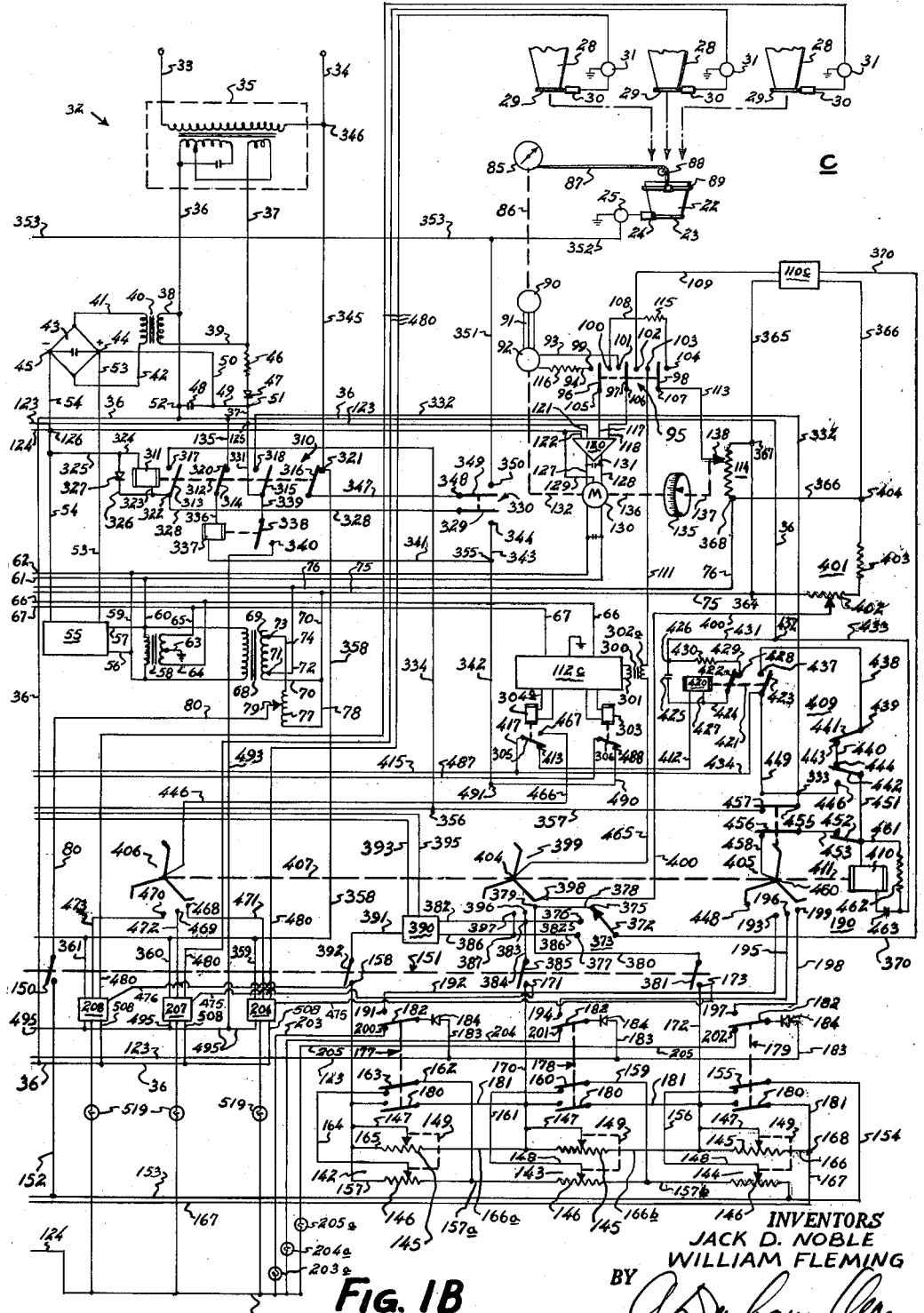

July 5, 1966  J. D. NOBLE ETAL  3,259,199
ELECTRONIC BATCH CONTROL SYSTEM
Filed Oct. 4, 1960  7 Sheets-Sheet 4
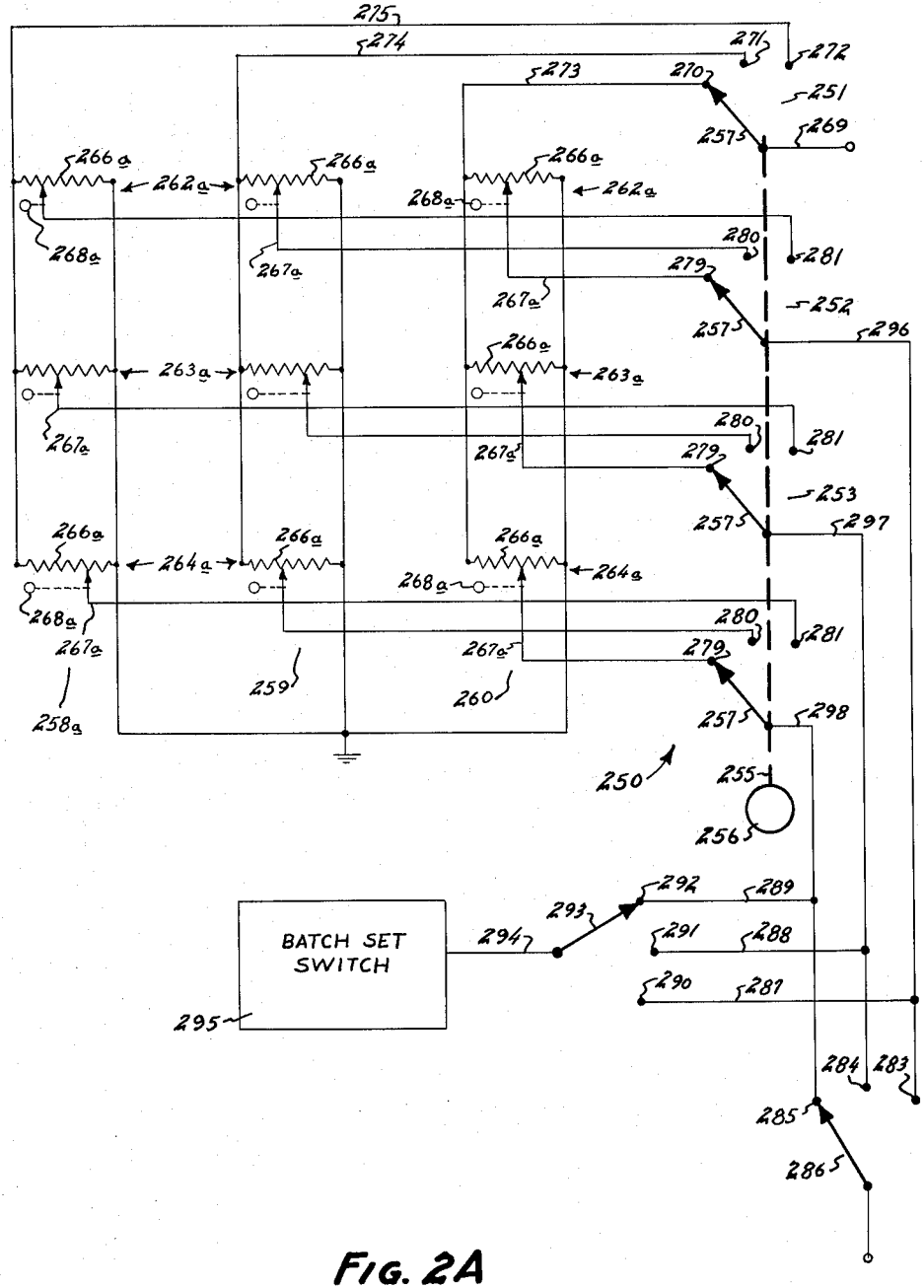
FIG. 2A
INVENTORS
JACK D. NOBLE
WILLIAM FLEMING
BY 
ATTY.

July 5, 1966    J. D. NOBLE ETAL    3,259,199
ELECTRONIC BATCH CONTROL SYSTEM
Filed Oct. 4, 1960    7 Sheets-Sheet 5

INVENTORS
JACK D. NOBLE
WILLIAM FLEMING
BY
ATTY.

July 5, 1966
J. D. NOBLE ETAL
3,259,199
ELECTRONIC BATCH CONTROL SYSTEM
Filed Oct. 4, 1960
7 Sheets-Sheet 6
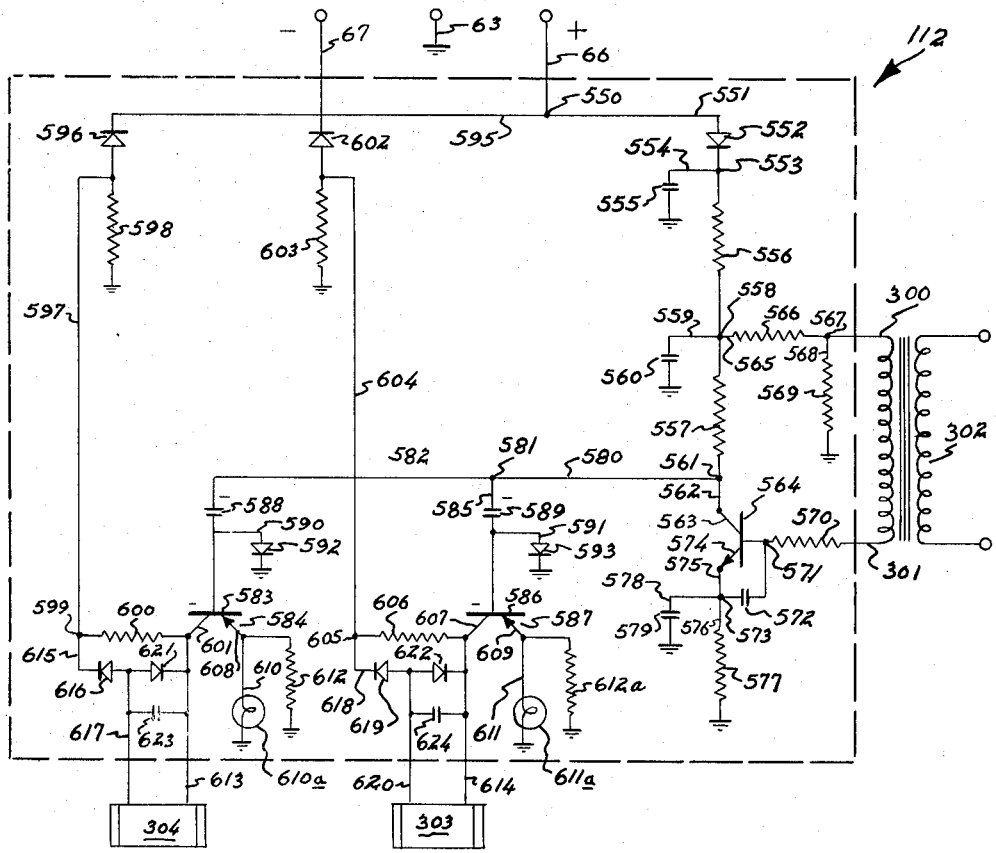
FIG. 6
INVENTORS.
JACK D. NOBLE
WILLIAM FLEMING.
BY 
ATTY.

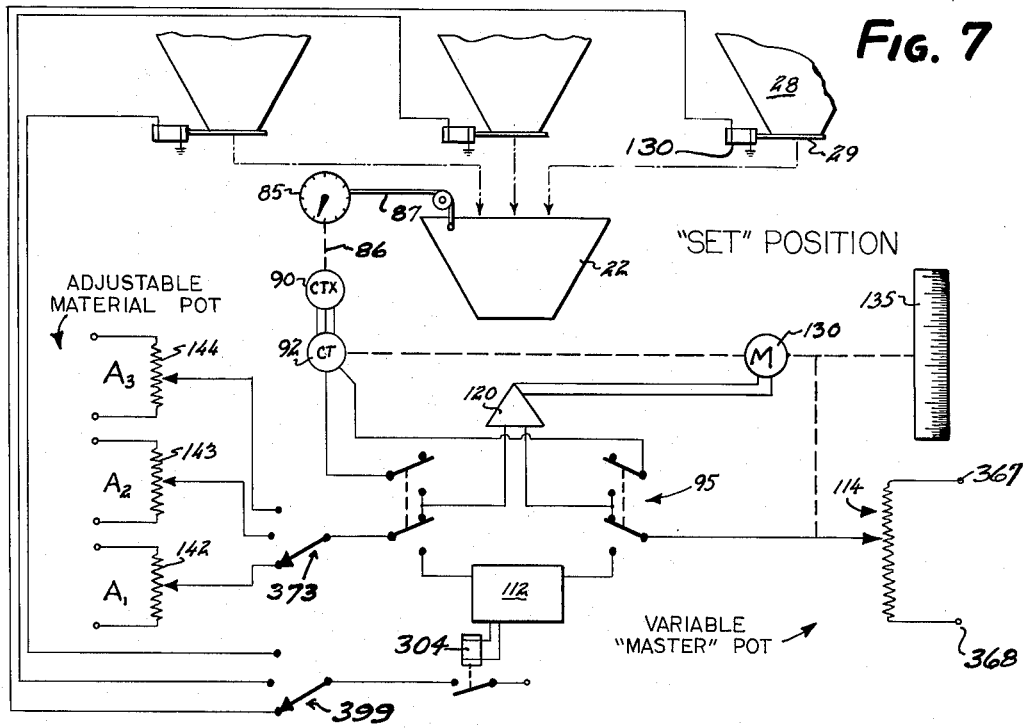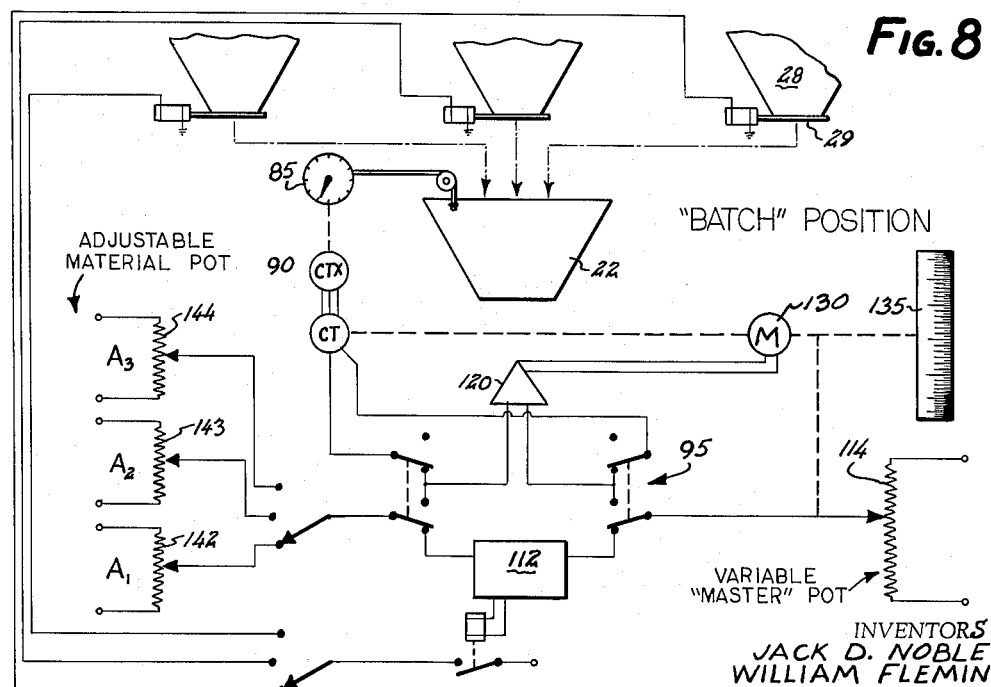

United States Patent Office 3,259,199
Patented July 5, 1966

3,259,199
ELECTRONIC BATCH CONTROL SYSTEM
Jack D. Noble, 3649 Happy Valley Road, Lafayette, Calif., and William Fleming, Oakland, Calif.; said Fleming assignor to said Noble
Filed Oct. 4, 1960, Ser. No. 60,510
26 Claims. (Cl. 177—70)

This invention relates to an improved batching plant, in which several ingredients are weighed out simultaneously in any of various pre-selected combinations and proportions. More particularly, the invention relates to an improved electronic batching-control system for such a batching plant.

A major objective of the present invention is to provide an improved electronic batching system which enables an operator (1) to pre-set a plurality of predetermined batch formulae, each calling for a different combination of ingredients, by simple manipulation of control-knobs on a console; (2) from among those set, to actuate selector-switches to select for each batch a desired formula; and (3) to place, by push-button control, control means for each of the ingredients in the formula into a batch-control circuit. Then a switch can be thrown which automatically will start and control the automatic weighing-out of each ingredient in the selected formula into its respective weigh-hopper, according to the weights set by the control-knobs. Finally, only after completion of the weighing operation and assurances of its accuracy, the ingredients are dumped from the weigh-hoppers. As will be seen from the following description, the present invention provides these functions by means of an ingenious new combination of elements, which cooperate to produce a new level of efficiency in the art of batching controls.

Greater flexibility, accuracy, reliability, and speed than have heretofore been attainable have for some time been needed in modern batching operations, because of the increased demands of industry for greater production, yet with increased quality control. For example, many modern construction projects such as dams and other large concrete structures require the pouring of several different parts of the concrete structure simultaneously. These different parts, such as the spillways, diversion tunnels, the outside face of the dam, the mass concrete, the railings, the buckets, etc., each call for concrete having different characteristics. The differences in characteristics are obtained by varying the relative proportions of the various sizes of aggregate, cement, and water, and by including various amounts of, or omitting, other elements such as ice. Therefore, one problem has been how to make instantaneous changes to a pre-selected mix-formula, without delaying the batching operations. Another serious problem has been how to achieve this speed while weighing out the various batch-formulas accurately, within the relatively close tolerances prescribed by construction codes and sound engineering practice, taking into account such factors as the moisture contents of the various ingredients, "in air" compensation during the weighing process, partial batch proportioning, and other important considerations.

The present invention not only solves the aforementioned operation problems of speed, accuracy, versatility, and flexibility of operation in the batching process, but it does so without creating a problem of complexity, which heretofore has affected reliability of batching systems.

In its novel arrangement of elements, the invention employs highly accurate potentiometers on which resistance values are set in advance to represent the weight of each ingredient of a predetermined batch formula. A servo-loop system is used in setting these potentiometers. When the pre-set potentiometers are switched into the batching circuit, a master scale-drum potentiometer is then driven by a motor in the servo-loop system. The motor driving the master scale-drum potentiometer is connected through the servo-loop system to a servo-transmitter driven by the dial scale on each of the weigh-batchers, and these scales thus act through the servo-loop system to send a voltage signal from the scale-drum potentiometer which is proportional to the actual amount of material in a weigh-hopper at any given instant. Voltages through the pre-set potentiometers are compared electrically with the voltage obtained through the master scale-drum potentiometer in a novel "batch-brain" or electronic error-sensing switch. Reaction of the batch-brain to the comparison of these voltages controls the closing of the inlet cut-off valve to the particular weigh-hopper and energizes a switch to close a circuit to the next weigh-hopper to start the weighing-out of the next ingredient. This cut-off feature of the present invention is accurate and reliable, and is provided, in addition to the constant visual reference of the weight of each material being weighed out, afforded by the scale indicator.

An important advantage of the present batching control system is that the weight of each material weighed out is directly proportional to an amount of shaft rotation, and this facilitates the use of a direct connection of the servo-drive system to a graphic recording means. Also, analog or digital conversion units can be adapted readily to provide a printed record of each ingredient in each batch weighed out. The servo-drive system of the invention provides ample power so that any recording means connected thereto will not cause a drag on the system and therefore a high degree of accuracy can be maintained.

Another important problem which this invention solves is how to compensate for the moisture contained by the various ingredients, when the device is employed for concrete batching. The sand used in a concrete formula often has a high moisture content. To conform to a concrete formula with the proper amount of total moisture content, according to the specification tolerances required, the amount of moisture in the sand must be compensated for by reducing the amount of separately added water originally called for in the mix-formula and by adding more sand to account for that portion of the weight of the sand which actually is water. This moisture-compensating function is accomplished in the present invention by means of multiple taps on a transformer in the sand set-up circuit. The operator merely pre-sets on an input-dial the known percent of moisture in the sand, and compensating voltages are computed automatically and applied to the sand-control potentiometer and the water-control potentiometer. The result is an increase in sand and a decrease in water, in the exact amounts necessary to maintain the correct ingredient proportions in the pre-determined concrete formula.

Briefly summarizing, one principal object of the invention is to provide a simplified yet highly accurate and reliable electronic batching-control system.

Another object is to provide a compact portable batching control which can be located conveniently remote from the batching equipment.

More specifically, another object of the invention is to provide a versatile batching-control system that can preset the amount of each of a plurality of materials of a predetermined batch-formula, to show the amount of the pre-set weight on a visually indicating scale-drum during setting; and then utilize the pre-setting means to control the batching cycle, a visual scale indication being provided as the materials actually are weighed out.

Another object is to provide means for rapidly pre-setting a complete formula, means for rapidly changing from one formula to another, and means for adjusting the weight on my particular material in the formula.

Another object is to provide a novel electronic switching means for energizing circuits which control the cut-off valve to a weight-hopper, this switching means being responsive to an unbalance of two voltages, one obtained by passing current through a pre-set resistance and the other by passing current through a resistance that varies with the actual weight of material in a weigh-hopper. This switching means can be adapted to provide a visual indication of an over-weight or under-weight condition in a particular hopper.

Another object is to provide an overweight-relay, which is responsive to an excess of material in a weigh-hopper, to prevent the starting of a new batching-cycle until that material is dumped.

Another object is to assure the accurate weighing-out of predetermined amounts of material by compensating for the material in the air between the material-supply bin and the weigh-hopper, when the flow-valve on the material supply bin is closed. The amount of "in-air" compensation needed can vary for different materials and circumstances, and the present invention provides a control circuit that adjusts conveniently for different situations so that the amount actually weighed out is the exact amount called for by the formula being used.

Still another object is to provide a single control device that can automatically set up fractional batches of a predetermined batch formula.

Another object is to provide a means responsive to the preset moisture-content of the sand being used for automatically producing the required increase in sand and the decrease in water necessary to produce the pre-set concrete formula in the correct proportions.

Other objects and advantages will appear from the following description of the invention and the drawings.

In the drawings:

FIG. 1B is a continuation of FIG. 1A and shows the remainder of the schematic diagram of the same batching-control system, including the power-supply section and the aggregates-controlling circuit.

FIG. 2A is a fragmentary schematic diagram of another alternate form of plural formula batching system with the material potentiometers arranged in a parallel connection.

FIG. 6 is a detailed circuit diagram of a "batch-brain" or voltage-comparing means used in the batching-control system of FIG. 1.

FIG. 7 is an enlarged schematic diagram showing a portion of a batching system according to the principles of the invention in the "set" position;

FIG. 8 is an enlarged schematic diagram of the batching system of FIG. 7, shown in the "batch" position.

Figure 1A:
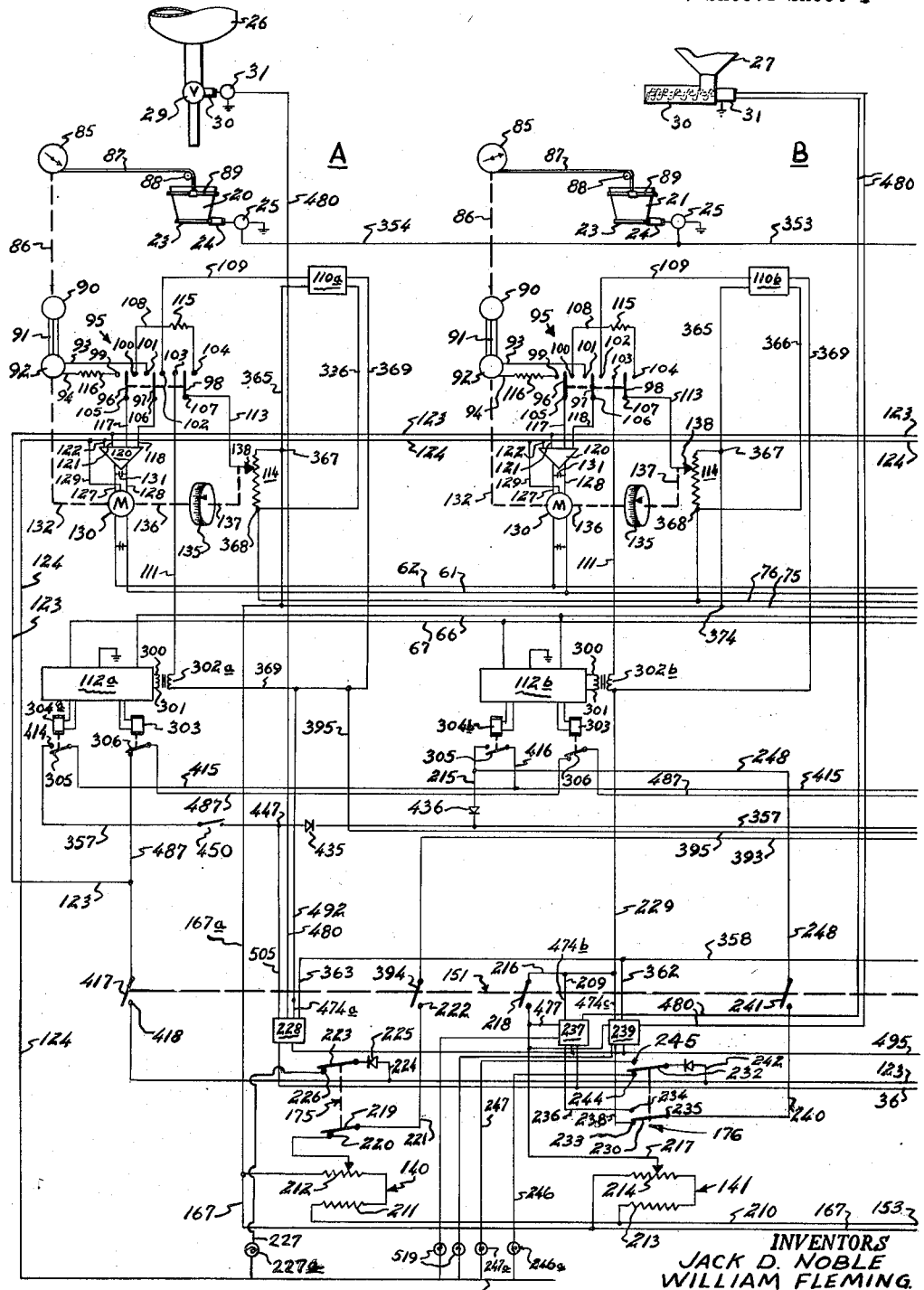
FIG. 1A is a schematic diagram of a portion of a concrete-batching control system embodying principles of the present invention, showing electrical circuits for controlling the addition of water and cement.

For purposes of disclosure, the invention will be described with reference to a simplified device having provisions for the preselection of only a limited number of formulae composed of sand, water, cement, and two sizes of aggregate. Thus the drawings and the description can be kept relatively simple, while still fully disclosing the principles of the invention. Actually, the invention can accommodate any desired number of input circuits on which various batch formulae can be pre-set and it can handle as many ingredients as desired, and as many formulae as desired, by mere duplication of components within the scope of the invention. While the invention will be described in terms of concrete, it can be applied to the batching of other materials, wherever one wishes to weight out and combine the constituents of a mixture.

Also, in presenting this description of one embodiment of the invention, it is not intended thereby to limit the invention to this one embodiment, as each manufacturer may vary each of the elements which make up the combination covered by the claims.

*Broad description of the invention (FIGS. 1A and 1B)*

Basically, the combination of the present invention includes a series of weigh-hoppers 20, 21, and 22, each with its separate scale 85 and a control cut-off means 29 on at least one material-bin 26, 27, 28 supplying each hopper 20, 21, and 22. A batch set-up circuit enables the operator to pre-set a fixed but adjustable electrical value proportional to the desired weight of each ingredient in a predetermined batch formula, and a batching-circuit receives a similar changeable electrical value that is constantly proportional to the actual weight of the material then within a weigh-hopper 20, 21, 22. As the weighing proceeds, a "batch-brain" or electronic sensing means 112 compares the two electrical values for each weigh-hopper and sends a control-signal responsive to those values to cut off the flow of each material when the desired amount is weighed into its weigh-hopper 20, 21 or 22. On completion of this weighing-cycle, all the hoppers 20, 21, and 22 are dumped together in any of the several well-known manners. The weighing-out process is performed in an automatic, sequential, or simultaneous operation. The many other features and functions incorporated in the batch-selection and control device of the present invention will become apparent as the device is described.

FIGS. 1A and 1B, taken together, show diagrammatically the combined batching plant, including a schematic circuit diagram of the basic control-system of the present invention. The simplified batching plant shown in the drawings has only three separate weigh-hoppers 20, 21 and 22, each weighing out one particular element or combination of elements of a selected mix. The water and cement are weighed into respective individual weigh-hoppers 20 and 21 which, with their respective control circuits A and B, are shown in FIG. 1A; but all of the aggregates, including sand, are weighed into the single weigh-hopper 22 shown, with its control circuit C, in FIG. 1B. It is obvious that there could be more or fewer than three weigh-hoppers, but three are sufficient to illustrate the principles of the present invention.

Each weigh-hopper 20, 21 and 22 has a gate 23 and a ram 24 for opening the gate, a magnetic air-valve 25 regulating the flow of air to one end of the ram 24. A spring (not shown) may be used to move the ram 24 to close the gate 25. Above the weigh-hopper 20 is a storage-tank 26 for water; above the weigh-hopper 21 is a storage-hopper 27 for the cement; and above the weigh-hopper 22 are three material-bins 28 for the two aggregates and the sand. Each of these material-supply sources is equipped with some type of cut-off control such as a gate 29. A ram 30, controlled by some suitable valve means such as a solenoid air-valve 31, may open and close the gate 29.

To describe adequately all of the elements of the present invention, each of the major components or sub-circuits that operate in combination to make up the complete batching system will first be described separately, beginning with the power supply.

*The batching-control power supply (FIG. 1B)*

A power conversion section 32 provides the various types of electrical power required by the batching-control device. An alternating-current supply source provides adequate current to the main power-supply leads 33 and 34, some of which is used without conversion in the solenoid valves 31 for the gates 29. Across the leads 33 and 34 is connected a constant-voltage (e.g., 118-volt) regulating transformer 35 with output leads 36 and 37. The transformer 35 is used only in making two streams of direct current.

For one stream of direct current, leads 38 and 39 are connected across the leads 36 and 37 and to a step-down transformer 40, which feeds a lower voltage alternating-current output (e.g. 24-volt) via leads 41 and 42 to a four-element bridge-rectifier 43. The direct-current output (e.g. 24-volt) of the rectifier 43 is positive at output-contact 44 and negative at contact 45. The other stream of direct current comprises a resistor 46 and a half-wave rectifier 47 (e.g. a 6-amp. silicon diode) in series with the lead 37. The lead 36 is connected through a terminal 52, a filter-condenser 48, and a lead 49, to a terminal 51 beyond the rectifier 47 in the lead 37. A lead 50 connects the positive-contact 44 on the bridge-rectifier 43 to the lead 49. Therefore, in the lead 37 beyond the terminal 51 there is a positive, direct-current voltage-source available which is either 24-volt or 125-volt, depending on which negative lead is used to complete the circuit. For example, between the terminals 51 and 52 the potential is 125 volts; but between the terminals 51 and 45 the potential is 24 volts.

The 24-volt direct-current from the rectifier 43 is also sent through leads 53 and 54 to an inverter 55 (e.g. 115-volt, 400-cycle). The inverter 55 supplies alternating-current across its output leads 56 and 57, first to a step-down transformer 58, second via leads 59 and 60 to leads 61 and 62 which power the servo-motors 130, as described in the next section, and third to a multi-tap transformer 68. The step-down transformer 58 has a center-tap 63 and output-leads 64 and 65 which produce a lower voltage alternating current (e.g. 26-volt) that is conducted by power-leads 66 and 67 to the batch-brains 112, as described in a later section.

The multi-tap transformer 68 has taps on its secondary winding 69, preferably giving multiples of 10 volts (e.g. 10, 20, 30, 40, 50, and 60 volts), relative to an end-lead 70. Thus a first-tap 71 on the secondary winding 69 may supply 10 volts to a lead 72, and a second-tap 73 on the secondary-winding 69 provides, through lead 74, the desired voltage (a multiple of that in line 72) to be applied to the set-up circuits containing the adjustable material-resistances, which will be described later. The leads 70 and 72 are connected to leads 75 and 76 which supply the master scale-potentiometers 114, also described later.

The lead 74 from the second-tap 73 is connected to one end of a well-known auto-transformer 77, the other end of which is connected by a lead 78 to the end-lead 70. The auto-transformer 77 has a manually adjustable arm 79 which is movable along the transformer winding to provide an output in a lead 80 which is some fractional amount of the input from the lead 74. The output-lead 80 supplies current to all the material-potentiometers 140, 141, 142, 143, and 144, as will be described later, and this transformer 77 can thus provide proportional batch-control where a predetermined formula is set up on the control system but only a fraction (e.g. ½, ¾) of the batch-amount is desired. The desired fraction of a total batch can be obtained by supplying to the material-potentiometers that fraction of the original voltage according to the position of the arm 79 on the auto-transformer 77.

*Servo-drive system (FIGS. 1A and 1B)*

A servo-drive system is provided for each of the water, cement, and the aggregates-circuits A, B, and C. The weigh-hoppers 20, 21 and 22, for the water, cement, and the aggregates, are each equipped with a separate scale 85, shown only diagrammatically. Each scale 85 is of the well-known dial type, having a central shaft designated here by a line 86, which is rotated as weight is added to its connected weigh-hopper. Each scale 85 is connected by a suitable lever-system 87 and a strap 88 to splice-levers 89 of its weigh-hopper 20, 21 or 22. On each scale-shaft 86 is secured the armature of a selsyn-type motor 90, well-known in servo-systems as a control-transmitter or selsyn-generator. Each control transmitter 90 is connected by the necessary wires 91 to a mating selsyn-type control-transformer 92, one in each of the batching-control circuits A, B, and C, so that the well-known phase relationship between the two components causes a signal to be generated in each control-transformer 92 when the armature of its control-transmitter 90 is rotated.

Each control-transformer 92 is electrically connected by leads 93 and 94 to a main batch-set switch 95, there being one switch 95 in each batching sub-circuit A, B, and C. Each batch-set switch 95 has three double-pole switch-arms 96, 97 and 98, which are mechanically ganged together to operate simultaneously. Each switch 95 has an upper row of input-contacts 99, 100, 101, 102, 103 and 104, and the switch-arms 96, 97 and 98 are connected to contact-points 105, 106 and 107, respectively. In FIGS. 1A and 1B, the circuits A, B, and C are in the "set"-position when the switch-arms 96, 97 and 98 are turned to the right. When the switch-arms 96, 97 and 98 are turned to the left, the circuits A, B, and C are in the "batch"-positions. When they are in the middle, as shown, they are in neutral or inactive position.

The lead 93 is connected to the contact 101, and the lead 94 is connected to the contact 99, through a resistor 116. The contacts 100 and 104 are connected together by a lead 108 having a resistor 115. The contacts 102 for the circuits A, B, and C are each connected by a lead 109 to a respective in-air compensation-component 110a, 110b, or 110c, explained in a succeeding section. The contacts 103 are each similarly connected by a lead 111 to a batch-brain 112a, 112b, or 112c, also explained later. Each contact 107 is connected by a lead 113 to a master scale-potentiometer 114 of its circuit A, B, or C. The resistances 115 and 116 as in the leads 108 and 94, respectively, provide a current-limiting function to stabilize the circuit for each batch-set switch 95.

Leads 117 and 118 extend from the contacts 105 and 106 to a servo-amplifier 120, there being one in each circuit A, B, and C. Leads 121 and 122 connect each servo-amplifier 120 to power-supply leads 123 and 124, which connect with leads 37 and 54 at terminals 125 and 126, respectively, (FIG. 1B), thus supplying 24-volt D.C. to each servo-amplifier 120.

Each servo-amplifier 120 is connected by leads 127 and 128 to a servo-motor 130, and a lead 129 connects the motor 130 to the return-lead 124. A condenser 131 between the leads 127 and 128 serves to balance the voltages to the servo-motor 130. The armature of each servo-motor 130 is linked by a suitable mechanical connection 132, such as a shaft, to drive the armature of the control transformer 92, to complete the servo-loop in each of the circuits A, B, and C.

Each servo-motor 130 drives a scale-drum 135 by means of a suitable mechanical connection 136, shown diagrammatically by a broken line. The scale-drums 135 preferably are cylindrical indicating devices which are provided with graduated longitudinal marks or divisions along their curved outer periphery, and are usually mounted in a batching-control console, to indicate a weight of a material, the weight being proportional to an amount of its angular rotation.

The servo-motors 130 also are connected mechanically by a shaft or other suitable means designated by a broken line 137, to drive the rotary master or scale-drum potentiometers 114. These may be of the well-known rotary-type potentiometers, wherein a contact-arm 138 attached to the shaft 137 provides a variable resistance by moving in contact with a circular winding, as shown diagrammatically in the drawing. Thus, each servo-motor 130 rotates its mechanically-connected drum 135 and its master-scale potentiometer 114 an angular amount which is exactly proportional to the electrical signal from the control-transformer 92 and hence directly proportional to the amount of rotation of the shaft 86 of the particular weigh-hopper scale 85.

*The batch set-up circuit (FIGS. 1A and 1B)*

Figure 2:
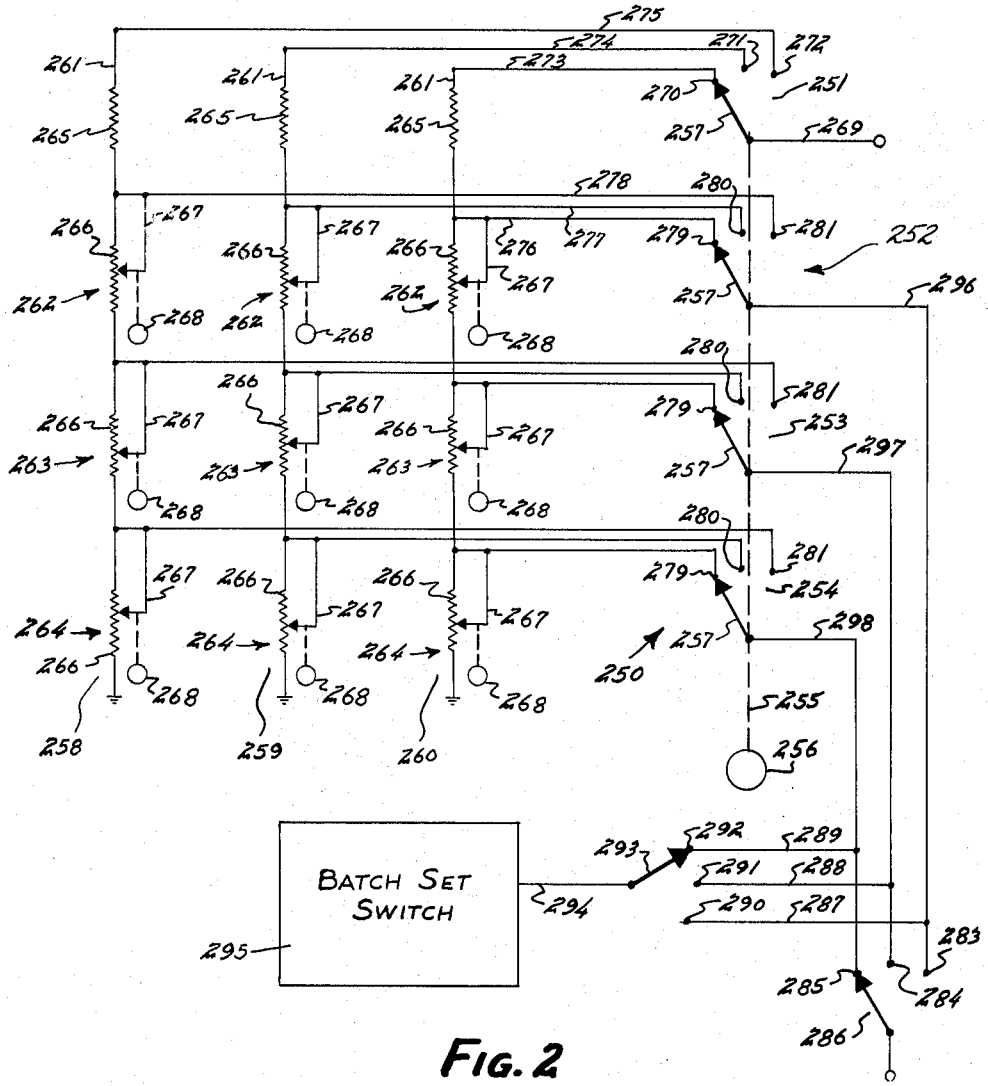
FIG. 2 is a fragmentary schematic diagram of a modified form of a multi-ingredient batching-control system having a plurality of formula strips, with material potentiometers in each strip arranged in series connection.

To simplify explanation, FIGS. 1A and 1B show only a one-formula set-up batching control. However, as mentioned above, any desired number of formulae set-up controls can be provided, any one of which can be switched into the set-up circuit when desired. A typical switching means that provides this versatility is shown in FIG. 2 and is described later.

Referring now to the bottoms of FIGS. 1A and 1B, the set-up system includes a series of material-control potentiometers 140, 141, 142, 143 and 144, each corresponding respectively to one of the five formula ingredients; that is, water, cement, sand, aggregate one and aggregate two.

The sand and aggregates material-potentiometers 142, 143, 144—shown in FIG. 1B—preferably are of the dual-winding type, although other types may be used within the scope of the invention, as will be described later. Each potentiometer has a front resistance element 145, a back resistance element 146, and movable contact arms 147 and 148 which are connected to a single shaft 149, shown diagrammatically by a broken line, and controlled by a single knob (not shown).

Power from the lead 80 passes to a switch-arm 150, one of many such switch-arms that are ganged on a main batch selector switch 151. Thence the power flows by a lead 152 to a branch-lead 153. The lead 153 is connected both to the end of the back-element 146 of the material-potentiometer 144 and to lead 154. The lead 154 is connected through a normally closed single-pole switch-arm 155 and a lead 156 to the movable contact-arm 148 of the potentiometer 144. The back resistance elements 146 of the three material potentiometers 142, 143, 144 are connected in series by leads 157a and 157b, and a lead 157 extends beyond them and terminates at a contact 158 on the batch-selector switch 151. A lead 159 extends from the lead 157b through a single-pole switch-arm 160 and a lead 161 to the movable contact-arm 148 of the material-potentiometer 143. Similarly, a lead 162 extends from the lead 157a through a switch-arm 163 and a lead 164 to the movable-arm 148 on the material potentiometer 142.

Connected to the lead 157 is a lead 165 to which are connected in series the front resistance elements 145 of the material-potentiometers 142, 143, 144, they being joined together by leads 166a and 166b and an end in lead 166 being connected to a return-line 167 at a terminal 168. The return-line 167 is connected to the line 75 by a line 167a (FIG. 1A). The front resistance movable-arm 147 on the material-potentiometer 142 is connected to the lead 157; on material-potentiometer 143, the movable-arm 147 is connected to a lead 170 that extends from the lead 166a to a contact-point 171 on the batch-selector switch 151; and on the material-potentiometer 144 the arm 147 is connected to a lead 172 that extends from the lead 166b to a contact-point 173 on the switch 151.

The dual-winding potentiometer system for the aggregates circuit C, as shown in FIG. 1B, enables any one of the individual aggregates-material potentiometers 142, 143, 144 to be adjusted separately, without requiring that the rest of the potentiometers be adjusted to compensate for the change in the one potentiometer. In other words, in a three-aggregate system, if all three aggregates are set originally at a resistance equivalent to 1000 pounds each, and then the first aggregate is increased by 200 pounds, to 1200 pounds, the change in the first potentiometer, using the dual-potentiometer system, does not decrease the second and third potentiometers, which still would keep their 1000 pounds worth of resistance as originally set. This important result follows from the fact that each dual-potentiometer has twin resistance-elements 145 and 146 of equal resistance, (e.g., 10,000 ohms), and each potentiometer is connected so that the current flows one way through the back-winding 146 and the opposite way through the front-winding 145; yet the movable-arms 147 and 148 on each potentiometer move the same direction when turned by their shaft 149; thus, total resistance of the circuit always is at a constant-value.

For example, when the amount of the back-resistance 146 through which current passes is decreased, conversely the amount of current which passes through the opposite front-resistance 145 is increased. The resistance change in only the front-element 145 is utilized to control the voltages to the respective contacts 158, 171 and 173 on the batch-selector switch 151. Therefore, any of the material-potentiometers 142, 143, 144 can be changed by adjustment of its control-knob and shaft 149, without affecting its total resistance value. For instance, if the potentiometer 142 were adjusted by moving both arms 147 and 148 to the left in FIG. 1B, the resistance through the back-winding 146 would decrease while the resistance through the front-winding 145 would increase by an equal amount. The total resistance of the potentiometer 142 has not been changed, but the increase in resistance of the front-element 145 causes a decrease in the total voltage which will be supplied by the lead 157 to the batch-selector switch contact 158.

In the remainder of the set-up circuit, shown in FIG. 1A, the material set-up potentiometers 140 and 141 provide the adjustable control resistance for the water and cement circuits A and B. Here, since only single materials are involved, single-element potentiometers are satisfactory. Power from the line 80 is supplied from the lead 152 via a lead 210 to the material-potentiometer 141, which is in parallel with the material-potentiometer 140. The water-potentiometer 140 may have a current-limiting resistance 211 in series with a resistance-element 212 of the potentiometer, which is connected to the return-line 167. Similarly, the cement potentiometer 141 may have a current-limiting resistance 213 in series with a resistance-element 214. A movable arm 217 on the cement-potentiometer 141 is connected when a switch-arm 218 on the batch-selector switch 151 is closed, by a lead 216 to a lead 229 which extends from a gate interlock-relay 239 to a coupling-transformer 302b for the batch-brain 112b of the cement-circuit B. A lead 209 also extends from the lead 216 to a gate interlock-relay 237 for the alternate cement-circuit.

Each of the material-potentiometers 140, 141, 142, 143 and 144 can be controlled separately by individual skip-control switches designated as 175, 176, 177, 178 and 179, respectively. The switches 177, 178, and 179 for the aggregates-material potentiometers 142, 143, 144 each have three ganged switch-arms, the first of which are the respective arms 155, 160 and 163. The second switch-arms 180 for the skip-switches 177, 178, 179 are connected in series in a lead 181 which is connected between the leads 157, 170, 172 and the return-line 167. These single-pole skip-switch arms 180 are normally open, but when each is closed it provides a bypassing-circuit which allows current to flow completely around its particular material-potentiometers 142, 143, or 144, in case that particular material is not being used during a given batching-cycle. The third series of switch-arms 182 is of the single-throw double-pole type, each arm 182 being connected by a lead 183 and an isolation diode 184 to the positive-lead 123 through the contact 418 and the arm 417 of the batch-selector switch 151 to the direct-current power supply 43. One contact for each switch-arm 182 is connected to a step-switch 190; a contact 191 on the sand potentiometer 142 being connected by a lead 192 to contact-point 193; a contact 194 for aggregate-one being connected by a lead 195 to a contact 196; and a contact 197 for aggregate-two being connected by a lead 198 to a contact 199 on the step-switch 190. The other poles 200, 201 and 202 on the switches 177, 178 and 179, respectively, are connected by leads 203, 204 and 205 to material-demand lights 203a, 204a and 205a which also are connected to the return-lead 124. Each of these lights will go on when its skip-switch is closed and the batch-switch 151 is closed, to indicate the material which will be weighed out in the next batch.

When the three mechanically-connected arms of any skip-switch 177, 178 or 179 are moved to the "skip"-position: the circuit through the back resistance-element 146 of its material potentiometer 142, 143 or 144 is broken; the circuit through its by-pass lead 181 is closed; and the circuit is closed from its stepping-switch contacts 193, 196 or 199 to the positive line 123 and the material-demand lights are disconnected from the positive lead 123.

The skip-switch 175 on the water-potentiometer 140 has a first-arm 219 normally connected to a contact-point 220 and a lead 221 connected to a contact-point 222 on the batch-selector switch 151. A second single-pole switch-arm 223, mechanically connected to the arm 219, is connected by lead 224 containing an isolation diode 225 to the power line 123. The arm 223 normally engages a contact 226 which is connected by a lead 227 to a material-demand light 227a.

The skip-switch 176 for the cement-potentiometer 141 has two switch-arms 230 and 231, which are linked mechanically to operate simultaneously. The arm 230 is movable between two contacts 233 and 234, the contact 233 being connected to a lead 238 and contact 234 to a lead 236. This provides a means to utilize either one of the two types of cement, since lead 236 goes from contact 234 to the gate interlock-relay 237 and lead 238 goes from contact 233 to the separate gate-interlock relay 239. The pivot-end 235 of the switch-arm 230 is connected by a lead 240 through a switch-arm 241 on the batch selector-switch 151, then through lead 248 to the lead 215.

The arm 231 of the switch 176 is connected at one end to the power-line 123 by means of a lead 242, which contains an isolation diode 243 and also is movable alternately between two contacts 244 and 145. These contacts are connected by leads 246 and 247, respectively, to the material-demand lights 246a and 247a, which also are connected to the return-line 124.

Both the water and cement material-potentiometers 140 and 141 also are controllable by knobs (not shown) so that their resistances can be varied manually to set-up and control the weighing out of the amounts of material called for in a particular batch-formula.

*The multiple formula strip circuit (FIG. 2)*

The present invention is not limited to having only the one series of material set-up potentiometers 140, 141, 142, 143 and 144, shown in FIGS. 1A and 1B. On the contrary, the invention lends itself to systems such as that shown in FIGS. 2 and 2A, having a multiplicity of material-potentiometer groups or formula-strips, each with a plurality of potentiometers, one for each material used in the batch. With such an arrangement, each potentiometer in a formula-strip can be adjusted to a pre-set value prior to the actual batching operation, to establish thereby a different batching formula or recipe on each formula strip. Thereafter, when a particular batching formula is desired during the batching operation, the pre-set resistance values corresponding to each ingredient in the formula may be introduced into the batching-circuit quickly, by mere manipulation of a batch-selector switch. The batch-selector switch 151 shown in FIGS. 1A and 1B has only one set of contacts, for one series of ingredients. FIG. 2 illustrates how the invention can be applied readily to a control system having any desired number of groups of potentiometers, each group being engageable by a multi-contact batch-selector switch 250.

In FIG. 2, the batch-selector switch 250 is shown schematically as a series of rotary contact-switches 251, 252, 233, 254, all mounted on the same shaft 255 and controlled by a single dial-knob 256 mechanically connected to four control-arms 257, one on each contact-switch. For purposes of explanation only, three potentiometer groups or "formula-strips" 258, 259, 260 are shown in FIG. 2, each strip comprising a lead 261 and a plurality of adjustable potentiometers 262, 263, 264, connected in series to ground. Although only three potentiometers are shown in each formula-strip in FIG. 2, it is apparent that any number of potentiometers in series may be used, depending on the number of ingredients being batched. A current-limiting resistance 265 is provided in each of the leads 261 to assure that the formula-strip 258, 259, 260 never will be shorted-out, even if current is applied when all the potentiometers 262, 263, 264 in series are turned down to zero resistance. It also should be noted that in FIG. 2 only single-element potentiometers are shown, to make the circuit easier to follow; but it is apparent from the foregoing description of FIG. 1B that dual-element potentiometers may be employed where desired, in any multiple-formula strip arrangement.

Each potentiometer 262, 263, 264 may be of the multi-turn rotary type and is shown schematically as having a resistance element 266 and a movable contact-arm 267 controlled by a knob 268 so that the contact-arm 267 can be moved along the element 266 to vary the amount of its resistance and, thus, the amount of voltage running through the element 266. The top switch 251 is supplied with a power-input line 269 which supplies power at some predetermined voltage (e.g. 30-volt) to the pivot-end of its movable-arm 257, in the same manner that power-lead 80 is applied to the switch-arm 150 and the material-potentiometers in the circuit arrangement shown in FIG. 1B. The top switch 251 also has three contact-points 270, 271, 272 for its movable-arm 257, which are connected respectively by leads 273, 274, 275 to the ends of formula-strips 258, 259, 260. Similarly, leads 276, 277, 278 connect at respective contact-points 279, 280, 281 on each of the switch-sections 252, 253, 254 and extend therefrom to the movable contact-arm 267 of other potentiometers 263 and 264 and to the series connections between successive potentiometers, as in FIG. 1A.

Leads 296, 297 and 293 extend from respective pivot-ends of the switch-arms 257 on the switches 252, 253, and 254 to contacts 283, 284, 285 on a stepping-switch 286 similar to the stepping switch 190 shown in FIG. 1B. Leads 287, 288, 289 extend from the leads 280, 281, 282 respectively, and are connected to contact-points 290, 291, 292 on a material-set switch 293 which may be, as shown in the circuit in FIG. 2, connected at its pivot-end by a lead 294 to a batch-set switch 295.

In FIG. 2A, the multiple-formula strip arrangement according to the invention is shown with the material-potentiometers 262a, 263a, 264a connected in parallel. The elements here are essentially the same except for the parallel connection. While this type of circuit connection lacks some of the advantages of the series connection shown in FIG. 2, it does have some advantages. For example, when weighing only two ingredients the proportion of weight between the two can be varied easily without affecting the total weight of the batch.

FIG. 1B shows only a single-formula strip, but it can be seen from the foregoing description and FIG. 2 that the present invention conveniently provides for any desired number of presettable formula-strips.

*The batching circuit (FIGS. 1A and 1B)*

Each of the sub-circuits A, B, and C of the embodiment of the invention shown in FIGS. 1A and 1B has a means to compare the electrical signals sent from its master-scale potentiometer 114 with the electrical signals sent from its material-potentiometers 140, 141, 142, 143, or 144. Thus, the water-circuit A has a signal-comparing means or "batch-brain" 112a, the cement-circuit B has a batch-brain 112b, and the aggregates-circuit C has a batch-brain 112c. A detailed description of the "batch-brain" will be found later in the specification, and its circuit is shown in FIG. 6. For the present, it is sufficient to note that each batch-brain 112 receives input-power through leads 66 and 67 from the center-tapped transformer 58, that each batch-brain 112 is connected by input-leads 300 and 301 to a coupling-transformer 302, and that connected to the output of each batch-brain 112 is an overweight-relay 303 and an underweight-relay 304. The underweight-relays 304, when energized, control switch-arms 305 and the overweight-relays 303 control switch-arms 306.

The batching-control system of FIGS. 1A and 1B is constructed so that, upon initiation of the batching cycle, the water, cement, and aggregates all will commence to be weighed out into their respective weigh-hoppers 20, 21, 22. This cycle is initiated by momentarily closing a starting-switch 330 which sends current flowing to a holding-coil 311 on a relay 310. The switch 310 is held closed until completion of the batching-cycle by a holding-relay 311 operating on a shaft 312 which is connected to four switch-elements of the relay 310, namely, normally-open switch-arms 313 and 315 and normally-closed switch-arms 314 and 316. Closure of the relay 310 closes the switch-arm 313 against a contact 317 and closes the switch-arm 315 against a contact 318; it also opens the switch-arm 314 away from a contact 320 and opens the arm 316 from a contact 321.

As will be seen later, the contact 317 is in the return-line from the underweight-relays 304; its closure acts to energize the coil 311 by passing power through the switch-arm 313, leads 322 and 323, to the coil 311, and leads 324 and 325 to the return (negative) lead 54 of the 24-volt direct-current bridge 43. For arc-suppression purposes, a lead 326 containing a diode 327 parallels the coil of the relay-coil 311 between the leads 325 and 322.

The power to the underweight-relays is sent through the switch-arm 315, coming from the positive direct-current line 37, the terminal 125, and a line 331 to the switch-arm 315 and thence, when the relay 310 is closed, via the contact 318 and the line 332 to a terminal 333 in the step-switch control-circuit to be described later. From there it passes, as described below, through the switches of the underweight-relays 304 and then by lead 357, terminal 356, and lead 334, back to the contact 317.

The circuit through the switch-arm 314 is broken when the relay 310 is closed, but when the relay 310 is open its circuit is closed, its contact 320 then being connected by a lead 335 to the return-lead 36 of the transformer 35. Going in the other direction, the switch-arm 314 is connected by a lead 336 to a master interlock-relay 337 having a switch-arm 338. The switch-arm 338 is normally connected by lines 339 and 331 to the power-lead 37 and is normally closed against a contact 340. When closed, the switch 338 sends current to the gate interlock-relays, as will be discussed later. However, when the relay 337 is closed, the switch 338 is open. The other side of the relay 337 gets its power (when the switch arm 314 is closed) by way of leads 341 and 342, the latter lead being connected to the return-side of the overweight-relays 303, as will be explained later. It may be noted that a lead 343 connects the lead 342 to a terminal 344 against which the switch-arm 329 is normally closed.

The contact 321 is connected by a lead 345 and a terminal 346 directly to the main A.-C. input-power supply-line 34.

From the pivot-end of the switch-arm 322 a lead 347 extends to a contact-point 348 on a switch-arm 349 of the batch-dump switch 330. Another terminal 350, which is in contact with the switch-arm 349 only when the switch 330 is in "dump"-position, is connected to a lead 351 which, in turn, connects by leads 352, 353 and 354 to the dumping-relays 25 on each of the weigh-hoppers 20, 21 and 22, the other side of the relays 25 being grounded. The switches 332 may be actuated either manually or automatically, and can be located on either the batching-console or at the batcher itself. However, for the sake of simplicity, this familiar circuitry has not been shown.

A lead 358 is also joined to the power-line 345 and extends parallel leads 359, 360, 361, 362, 363, which are connected to the gate-interlock relays 206, 207, 208, 239, and 228, respectively.

Figure 4:
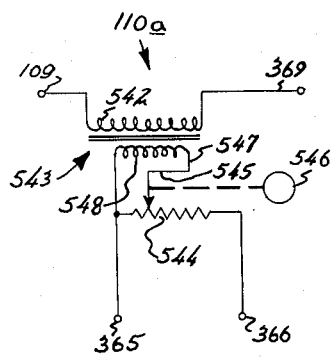
FIG. 4 is a detailed schematic diagram of the in-air compensation component employed in the batching-control system of FIG. 1.

As mentioned above in connection with the servo-drive system, the lead 109 extends from each batch-set switch 95 to the appropriate in-air compensation component 110a, 110b, or 110c. These components are described in detail below, with reference to FIG. 4. For now, it will be noted that leads 365 and 366 extend from each component 110a, 110b, and 110c to opposite ends of the resistance-element of its associated main scale-drum potentiometer 114 at respective contacts 367 and 368. The leads 365 also pass through their contacts 367 and terminate at a contact-point 364 in the return power-lead 75. The contacts 368 on the three scale-drum potentiometers 114 of circuits A, B, and C all are connected in parallel to the lead 76. Thus the three scale-drum potentiometers 114 are in parallel across the lines 75 and 76, which supply them with 10-volt alternating-current. The in-air compensation cmoponents 110a, 110b, and 110c, are also in parallel with each other and with the potentiometers across the same lines.

In each of the water and cement circuits A and B, another lead 369 extends from each component 110a and 110b to the coupling-transformer 302a or 302b on the batch-brains 112a and 112b, respectively. In the aggregates-circuit C, a similar lead 370 extends from the component 110c to an arm 372 of a material-selector switch 373. The arm 372 can be moved to be engageable alternately with any of contact-points 375, 376 and 377. Extending from the contact-point 375 is a lead 378 to a contact 379 from which a lead 380 extends to the pivot-end of a switch-arm 381 of the batch-selector switch 151; when the switch-arm 381 is closed, it engages the contact 173 that is associated with the material-potentiometer 144. From the contact-point 376 extends a lead 382 to a contact-point 383 and thence by lead 384 to the pivot-end of another switch arm 385 of the batch-selector switch 151. When the switch-arm 385 is closed, it engages the contact 171 associated with the material-potentiometer 143. From the contact point 377 a lead extends to a contact-point 387.

The leads 382 and 386 are extended beyond the contact-points 383 and 387 and are connected to a moisture-control component 390 which provides a means to compensate for the moisture in the sand, to maintain the exact moisture called for in a particular batch-formula. A detailed description of the moisture-compensation control 390 is presented later, with reference to FIG. 3. A lead 391 extends from the moisture-control 390 to a switch-arm 392 in the batch-selector switch 151; when the switch-arm 392 is closed, it engages the contact 158 associated with the sand-potentiometer 142. Another lead 393 extends from the moisture-control 390 to a switch-arm 394 (FIG. 1A) in the batch-selector switch 151; when the switch-arm 394 is closed, it engages a contact 222 associated with the water-potentiometer 140. Still another lead 395 extends from the control 390 to the coupling-transformer 302a for the batch-brain 112a in the water-circuit A.

Connected directly to the respective contact-points 383 and 387 are the contact-points 396 and 397 of the middle-stage 399 of the stepping-switch 190. A home-contact 398 is connected by a lead 400 to a "zero balance" circuit 401, comprising an adjustable resistance 402 connected at one end to the contact-point 364 in the return-lead 75 and at the other end through a load-resistance 403 and a terminal 404 to the lead 366.

The step-switch 190 has the first and third stages 405 and 406, in addition to the middle stage 399, and all three stages are linked together mechanically on a single shaft indicated by a broken line 407. While any suitable stepping-switch of the various types found in the art could be employed, it is preferred that the stepping-switch 190 be the well-known spring-driven type which, as shown, is driven by a stepping-coil 410. When the stepping-coil 410 is energized, the spring is cocked but the stepping-switch does not move; then, when the coil 410 is de-energized, the spring moves the step-switch ahead one step. Since this stepping-switch actuation mechanism is old in the art, it is not shown in detail but is here merely indicated by the broken line 411 that is connected to the line 407. In essence, the mechanism amounts to a ratchet-wheel connected to the arm of the stepping-switch which, when energized, pulls down a spring-loaded pawl on the stepping-switch shaft. Then, upon de-energization of the coil, the spring and pawl rotate the stepping-switch.

The stepping-switch control-circuit 409 is supplied with current through a lead 412 from a contact 413 of the underweight-relay 304 of the aggregates batch-brain 112c. Power is supplied originally to the underweight-relays 304 of all of the batch-brains 112 through the lead 332 from the contact 318 on the start-relay 310 which supplies current through the leads 434, 417 and 415. With that water underweight-relay 304a de-energized, its switch-arm 305 is closed against the contact 414 and its pivot-end is connected by leads 415 and 416 to the switch-arm 305 on the underweight relay 304b for the cement-circuit B and by leads 415 and 417 to the switch-arm 305 on the underweight-relay 304c of the aggregates-circuit C, which is normally in contact with the terminal 413.

The lead 412 supplies current to a relay-coil 420 of the type known as a pulsing-relay, which controls a shaft 421 connected to a pair of switch-arms 422 and 423. A lead 424 connected to the pivot-end of the switch-arm 422 and containing a condenser 425 is connected to a contact-point 426. Also connected to the lead 424 is the output-lead 427 from the relay-coil 420. From a contact 428 normally in contact with the switch-arm 422 extends a lead 429 having a resistor 430 and joining the lead 424 at the contact-point 426. A lead 431 extends from the contact-point 426 to a contact 432, which is connected to the return-lead 36 from the power supply, and from this contact 432 a lead 433 goes to the stepping-coil 410.

The pivot-end of the switch-arm 423 of the pulse-relay 420 is connected by a lead 434 to the lead 415. A normally open contact 437 for the switch-arm 423 is connected by a lead 438 to a contact 439 on a manually operated restart-hold switch 440, which has two movable arms 441 and 442. During the automatic weighing-out operation, the arm 441 remains against a contact-point 443 and arm 442 remains against a contact-bar 444, to pass current to the stepping-coil 410 whenever the pulse-relay is energized. However, if it is desired to check the weight of each aggregate individually, after it has been weighed out; that is, have the first material weigh out and then stop; the arm 441 of the restart-hold switch 440 is manually opened to a "hold"-position before starting the operation, thereby breaking the pulsing circuit to the stepping-coil 410; then the pulse from the pulse-relay 420 cannot actuate the coil 410 and step the stepping-switch 190 ahead. In order to start the next ingredient weighing, the pulse to the stepping-coil 410 must be produced artificially. This is accomplished by momentarily moving the switch-arm 442 to a "restart"-position in contact with a terminal 446 and then letting it go back, as by a spring-return, to its "automatic"-position into contact with the terminal 444. This supplies a pulse of current from the connecting power-lead 332 through the terminal 333 directly to the stepping-coil 410 for as long as the switch-arm 442 is held in the restart-position; as soon as it is released, the stepping-coil 410 moves the stepping-switch 190 ahead to the next aggregate-material. To complete the return to "automatic," the switch-arm 441 must, of course, again be closed.

In the stepping-coil circuit 409 a lead 451 that connects the stepping-coil 410 to the switch-arm 442 is connected to a lead 453 by a normally closed switch-arm 452. The lead 453 goes to a pivot-contact 454. The lead 332 is connected to a pivot-contact 455. Pivoted about the contact-points 454 and 455 are respective switch-arms 456 and 457, which are linked mechanically and are normally closed against respective leads 458 and 357. The lead 458 is connected to a center-contact 460 of the first step-switch stage 405. The switch-arms 456 and 457 are located so that they are opened by one arm of the step-switch stage 405 when the step-switch moves from the contact 193 to the contact 448.

Connected to the stepping-coil 410 by the lead 451 is a lead 461 containing a resistor 462 and a condenser 463, which provide an arc-suppression function for the stepping-coil 410, and to this circuit is connected the lead 433 from the pulse-relay 420.

The center-contact 464 of the second-stage 399 of the stepping-switch 190 is connected by a lead 465 to the coupling-transformer 302c for the aggregates-circuit C. The third stepping-switch stage 406 is connected at its center-contact by a lead 466 to a contact 467 against which the relay-switch 305 for the aggregates batch-brain 112c moves when that relay 304 is energized. Contact-points 468, 469 and 470 on the third-stage 406 are connected by leads 471, 472 and 473 respectively to the gate interlock-relays 206, 207, and 208. Leads 474, 475 and 476, respectively, connect the batch-selector switch-contacts 173, 171, and 158 to the relays 206, 207, and 208.

The arrangement of the invention wherein the scale drum 135, the master potentiometer 114, the adjustable material potentiometers and the servo drive accomplish both the set and batch control functions may be even more clearly understood with reference to FIGS. 7 and 8. FIGURE 7 represents the aggregates weighing station of FIG. 1B in simplified form with the system in the "set" position. As shown, the material supply bins 28 are situated above the weigh-hopper 22 and each has an electrically controllable gate 29 that can cut off the flow of material therefrom. The mechanical scale 85 is linked directly to the weigh-hopper 22 and measures the weight of material in it at all times. The control transmitter 90 of the servo-drive system is electrically connected to the control transformer 92 of the batching control apparatus which may be located at a remote control station with respect to the weigh-hoppers and supply bins. The control transformer of the servo-drive system is mechanically connected to the servo motor 130 and to the master potentiometer 114. The latter is also mechanically connected to the scale drum 135. The servo motor 130 is electrically connected to and is therefore energized in response to a signal from a servo amplifier 120 in the system. The batch-set switch 95 connects the servo amplifier 120 to the control transformer 92 and the control transmitter 90 of the servo-drive system in the batch position, and in the set position the servo amplifier is connected to a selected one of the adjustable resistances provided by the settable material potentiometers 142, 143, or 144 each controlling flow from one of the three lines 28. Only one of these potentiometers is connected into the system at one time by means of the material selector switch 373 which is provided for selecting the potentiometer for a particular material. The step switch stage 399 which is connectible to leads extending to the supply bin gates is also connected to the underweight relay 304 of the batch brain 112. This null detector or batch brain 112 is connected to the batch side of the switch 95. When the desired batch is to be set on the device, the switch 95 is placed in the "set" position and each adjustable resistance is adjusted by turning its knob (not shown). The power supplied to each of the material potentiometers is equal to the power being supplied to the master potentiometer. In the set position shown in FIG. 7, the servo amplifier 120 is receiving the voltage from the material potentiometer 142 which is being adjusted and also from the master potentiometer or variable-resistance 114 through its terminals 367 and 368. This voltage from the material potentiometer is supplied to the servo amplifier and since it is not immediately balanced to a null by an equal voltage from the master potentiometer, the servo amplifier causes the motor 130 to drive the master potentiometer 114 and its attached indicator drum 135. This continues until the resistance of the master potentiometer exactly equals that placed on the adjustable potentiometer (142) at which point the indicator drum 135 then reads the desired number of pounds to be weighed out. This same procedure can now be followed for the other adjustable potentiometers 143 and 144 representing other materials. When the setting procedure has finished, each material potentiometer has been adjusted to a resistance that has been equaled exactly by the same resistance on the master potentiometer and which has been governed by visual reference to the indicator drum. The switch 95 is now put in the batch position as shown in FIG. 8 which causes the master potentiometer 114 and the scale drum 135 to turn back to its zero position. When the valve 29 is opened, the material flows into the weigh-hopper, the scale 85 rotates, and through the servo-drive system it drives the master potentiometer and its connected indicator drum. Now a voltage is being supplied from the adjustable potentiometer (e.g., 142) which is connected to the switch 95, and as the material flows into the weigh-hopper the master potentiometer 114 is turning and is varying its voltage. Both of these voltages are supplied from the switch 95 to the null detector or batch brain 112. When the null point is reached, that is, when the voltage from the master potentiometer equals the voltage from the material potentiometer which has previously been set to correspond to the amount of material to be weighed out, the batch brain sends a signal to the valve 29 cutting off the flow and leaving the weigh-hopper filled with the desired amount of material that was originally set.

*The gate relays and interlock system (FIGS. 1A, 1B, and 5)*

Figure 5:
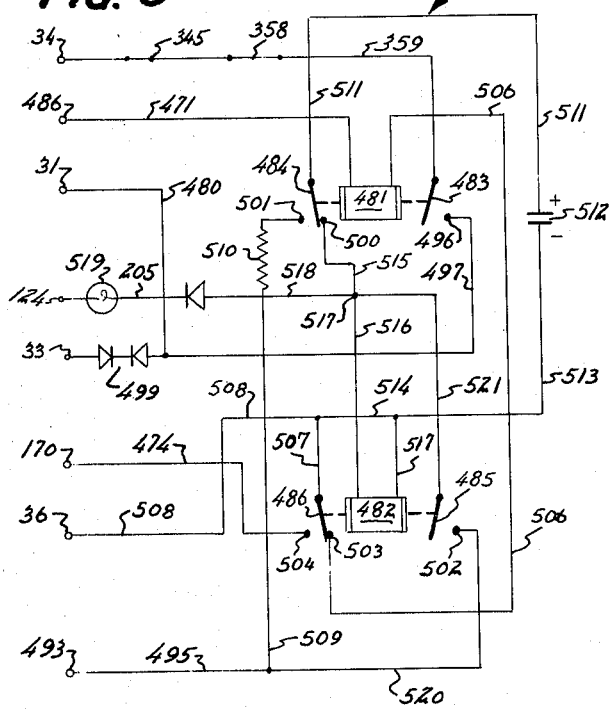
FIG. 5 is a detailed schematic diagram of a gate-selector and interlock-relay employed in the batching-control system of FIG. 1.

The batching system includes a gate-relay for each of the materials being weighed out, a lead 480 extending from each of the gate interlock-relays 206, 208, 237, 239, and 228 to the solenoid 31 on the gate-ram of each of the material-supply sources 26, 27 and 28. All these gate interlock-relays are interconnected in an interlock system so that no material can be dumped until all of them have been weighed out according to the predetermined set-formula. Actually, as shown in FIG. 5, each gate interlock-relay 206, 207, 208, 237, 239, and 228 comprises two interconnected relays: an upper or gate-relay 481 and a lower or interlock-relay 482, each of them controlling two switch-arms; the relay 481 has switch-arms 483 and 484, while the relay 482 has switch-arms 485 and 486.

In FIG. 1A, the leads 474b and 475b are connected from lead 216 to the cement gate-interlock relays 237 and 239 and provide an artificial zero-weight condition at such time as the cement is completely weighed out. A similar lead 474a, which accomplishes the same purpose for the water circuit, is connected from the water interlock-relay 228 to the lead 369a connected to the water batch-brain 112a.

Another input to the gate interlock-relays comprises a lead 493 which extends from the back-contact 340 of the master interlock-coil switch-arm 338 on the batch-start relay 310 and connects to the leads 495, which thus supply 125+ volt direct-current to each gate inter-lock-relay when the switch 338 is closed, which is when the relay 337 is de-energized.

The gate solenoids 31 are connected to the main alternating current power-line 34 through their respective gate relays. For example, considering the gate interlock-relay 206 (FIG. 5), the alternating-current power-line 34 is connected by the leads 345, 358 and 359 to the normally open switch-arm 483 of the gate relay 481. When the gate relay 481 is energized, the switch-arm 483 engages a contact 496 and sends alternating-current power through a lead 497 and the lead 480 to the associated gate-solenoid 31. The other gate interlock-relays 207, 208, 237, 239 and 228 similarly send power through their switch-arms 483 to their gate-solenoids 31, when their gate relays 481 are energized, the power for them coming from the lead 358 by way of the parallel leads 360, 361, 362 and 363. There also is arc-suppressor 499 from the lead 497 to lead 33. This serves to quench the surge of voltage during de-energization of the gate-solenoids, thus protecting the contacts 483 and 496 of gate-relay 481.

The other switch-arm 484 of the gate-relay 481 normally engages a contact 500, but engages a contact 501 when the relay 481 is energized.

On the interlock-relay 482, the switch 485 is normally open, but engages a contact 502 when the relay 482 is energized. The switch-arm 486 normally engages a contact 503, but when the relay 482 is energized it engages a contact 504.

As explained later in the operation section, when the weighing commences and the underweight-relays 304a, 304b and 304c are energized, power will be supplied to the gate relays as follows: (a) directly from the underweight-contact 414 via lines 357 and 505 to the water-gate interlock-relay 228; (b) directly from the underweight-contact 305 of underweight-relay 304b through lead 248 through the batch selector 151, arm 241, and leads 240 and 235 of the cement selector switch 176 which will then direct the underweight signal through leads 236 or 238 to gate-contactors 237 or 239 respectively. The leads 236 and 238 correspond to the lead 471 in FIG. 5; and (c) from the stepping-switch contacts 468, 469 and 470 to the relays 206, 207 and 208 in turn, by the leads 471, 472 and 473.

Considering the relay 206 as an example of how all three gate interlock-relays work, the line 471 is connected to the gate relay 481. The other lead 506 from the gate-relay 481 goes to the contact 503 and, when the switch 486 is closed against the contact 503, it goes through leads 507 and 508 to the return-line 36. Hence, when the stepping-switch contact 468 is connected to the center-contact for the switch 406, the gate relay 481 will be energized, and at all other times it will be de-energized.

It has been explained already that when the gate relay 481 is energized it energizes the gate solenoids 31 by closure of the switch 483. At the same time, the switch 484 is closed against the contact 501. At that time, direct-current power flows by the leads 37, 331 and 339, the relay-switch 338, the contact 340, and the leads 493 and 495, a lead 509, a resistor 510 (e.g. 15,000 ohms), the contact 501, the switch-arm 484, a lead 511, to a condenser 512 (e.g. 20 microfarads), this direct-current circuit being completed by leads 513 and 514, the lead 508, and the return-line 36. During this time, the net effect through this line is simply to charge the condenser 512. However, when the gate relay 481 is de-energized (as it will be when the correct amount of its ingredient has been weighed out), the switch 484 will move from the contact 501 to the contact 500. Then, the condenser 512 discharges through the lead 511, the switch 484, the contact 500, leads 515 and 516, the interlock relay-coil 482, and leads 517, 514, 508 and 36. Current also can pass from lead 515 to a light 519 by way of a lead 518 and the lead 205. A "material-weighed" light 519 is provided for each ingredient, said lights being connected to each of the gate contact-relays 228, 237, 239, 206, 207, and 208 and grounded to the return-lead 124.

This pulse from the discharge of the condenser 512 energizes the interlock-coil 482 and moves its switches 485 and 486. Once energized, the interlock-relay 482 is self-holding, for current from the lead 495 then passes by lead 520, the contact 502, the switch 485, and leads 521 and 516 into the coil 482, and thence as before is returned by the leads 517, 514, 508 and 36. The light 519 remains lighted, showing completion of the weighing of that ingredient.

Energization of the interlock-relay 482 prevents re-energization of the gate relay 481, since the circuit is open between the contact 503 and the switch 486. It also completes the circuit from the lead 474 which is only in the water and cement interlock-relays 228, 237, or 239. The lead 474 is connected by contacts 504 and 486 through leads 507 and 508 to the ground-return 36. The leads 474a and 474b or 474c therefore ground out the formula-strip inputs through the leads 492 and 229 and the leads 369 connected to the batch-brains 112a and 112b, and thereby set up the artificial zero-weight conditions in the water or cement batching circuit. The zero-weight condition for the aggregates-circuit is obtained in another manner, which will be discussed later.

The interlock-relays 482, once energized, remain energized until all of them are energized, at which time all the underweight relays 34 have opened. Then the master interlock-relay 337 is energized, opening the circuit to the lead 493, and all the interlock-relays 482 return to their de-energized position, enabling energization of the gate-relays 481 at the proper time.

*In-air compensation (FIG. 4)*

To accomplish the precise weighing-out of the materials in the batch-formula, allowance must be made in the control-system for the material which is in the air when the flow-cutoff signal is transmitted to the material-supply source, so that the ultimate total-weight of material in each weigh-hopper 20, 21, 22 is that called for by the batch-formula being used. In the present invention, this weight adjustment is provided for by artificially placing a small voltage, which itself can be increased and decreased, in series with the balancing line-voltage through the material potentiometer 114. Each of the circuits A, B, C has an in-air compensation components 110a, 110b, 110c, respectively. The component 110a is shown schematically in FIG. 4, and the other components 110b and 110c are just like it.

The lead 108 from the batch-set switch 95 connects to one end of a secondary-winding 542 of a transformer 543. Attached to the other end of the secondary-winding 542 is the lead 369 which extends to the coupling-transformer 302a: (in the circuit C, a similar lead 370 extends through the stepping-switch 190 and then to the coupling-transformer 302c). The leads 365 and 366 extend from the resistance-element of the master-scale potentiometer 114 and are connected to a resistance element 544, on which is an adjustable contact-arm 545 that is controlled by a knob 546. The lead 365 and a lead 547 extending from the arm 545 are connected to the opposite ends of the primary-winding 548 of the transformer 543. Thus, by regulating the resisatnce in series with the winding 548, the voltage therein and consequently the voltage in the output lead 369 of the secondary-winding 542 will be regulated accordingly.

In operation, the amount of in-air weight to be accounted for in a given formula is set manually for each ingredient by turning its knob 546, which artificially sets up an initial balancing-line voltage of the amount desired. For example, if in the aggregates circuit C each aggregate required a 150-pound compensation, the knob 546 would be turned until the initial reading on the aggregates-indicating scale-drum 135 reached 150 pounds. Then, if 1000 pounds of each aggregate were required in the formula, each aggregate-material potentiometer 142, 143 and 144 would be set until the scale-drum 135 indicated 1000 pounds; which means that the amount of resistance set on each potentiometer 142, 143 and 144 is equivalent to an additional 850 pounds of material. Thus, when the weighing-out cycle takes place, the flow-gate 29 on each material-bin 28 will close when the weight it has delivered to the weigh-hopper 22 is at 850 pounds. The other 150 pounds which has left the material-bin 28 but has not yet reached the weigh-hopper 22 then will fall in, to make the total amount 1000 pounds as called for by the formula. It is necessary only to crank in the in-air compensation once, into the aggregates-circuit, unless it is to be changed for each of the ingredients. As long as the amount of weight in terms of voltage is imposed on the out-put balancing-line or lead 369, the compensating-voltage will combine with the voltage through a material-potentiometer 114, to set the flow-cutoff point.

*Moisture-compensation circuit (FIG. 3)*

Figure 3:
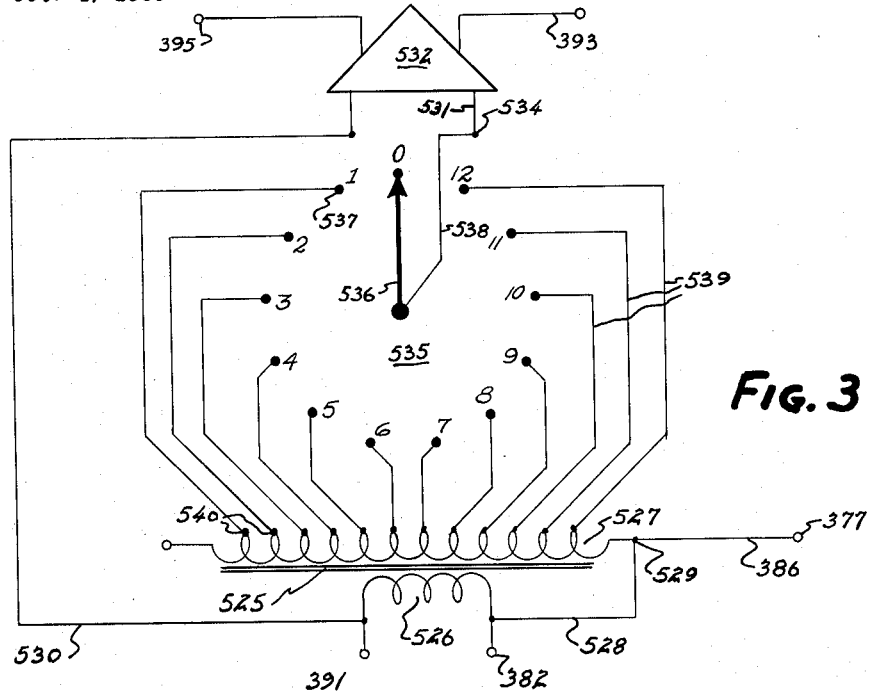
FIG. 3 is a detailed schematic diagram of the moisture-compensation component employed in the batching-control system of FIG. 1.

In FIG. 1, the moisture-compensation component is shown as a block 390 connected in the main control-circuit. FIG. 3 shows a detailed circuit-diagram of this feature of the invention. In essence, the water-compensation means 390 comprises a multiplying transformer 525 having a primary-winding 526 and a secondary-winding 527. One input-lead to the primary 526 is the lead 391 shown in FIG. 1B as extending from the switch-arm 392, which carries current that has come from the alternating-current power-source 80 via the set-up potentiometer 142 for sand. The second input-lead to the primary 526 is the lead 382 which is connected by the lead 384 to the switch-arm 385. Attached to the input-lead 382 is a lead 528 that is connected to a contact 529 at one end of the secondary-winding 527. Also connected to the contact 529 is the output-lead 386 which, as shown in FIG. 1B, extends to the contact 377 in the material-selector switch 373.

To the input-lead 391 of the primary-winding 526 is attached a lead 530 which comprises one input-lead to an amplifier 532.

A rotary-switch 535 having a central pivotal contact-arm 536 is provided adjacent the secondary-winding 527 of the transformer 525. Arranged in a circular pattern around the center of the rotary-switch 535 is a series of evenly-spaced contact-points 537, each separately engageable by the contact-arm 536, each contact 537 representing, for example, a one-percent increment in the moisture content percentage of the sand. A convenient range is from 0–12% requiring thirteen of the contact-points 537, including the zero-position (and so numbered from 0 to 12 on the drawing), although any range of value could be used within the scope of the invention. The contact-arm 536 is connected by a lead 538 connected to the junction 534 and therefore to a lead 531 which provides a second input to the amplifier 532.

Each contact-point 537 on the switch 535 is connected by a lead 539 to one of a series of taps 540 on the secondary-winding 527. Each tap 540 is located so as to provide the increase in voltage-ratio required on the output of the secondary-winding 527 in order to represent the additional amount of sand that must be added to make up for the moisture-content in the sand.

For example, if the formula called for 2000 lbs. of sand and it had 10% moisture, 200 lbs. of sand would have to be added; and because 10% of the 200 lbs. would be moisture, another 20 lbs. would have to be added; and because 10% of that was moisture, another 2 lbs. would have to be added; and so on down the line. Therefore, to a 2000-pound mixture with 10% moisture, at least 222 lbs. of sand should be added. Thus, the ratio set up on the 10% moisture tap 537–10 represents a multiplying factor of 1 to 1.111 and if, as in the foregoing example, the 2000 lbs. of sand called for by the formula were normally represented by an actual voltage of 2-v., two volts at the lead 391, then, when it was multiplied by the 1.111 factor, this voltage would become 2.222-volts at the lead 393.

Another phase of the water-compensation problem is the adjustment in the weight of water called for by the formula, which is based on having dry sand, by subtracting from this value the amount of water already present in the adjusted total amount of sand. This is not a percentage function, as in the adjustment of the sand content, but rather an arithmetical function. Continuing with the above example, the 222 lbs. represents the total water-content in the 2222 lbs. of sand with 10% moisture. The increased voltage of 0.222-volts representing this increase in weight (with the rotary contact-arm 536 at contact 537–10) is the difference between the potential at the input-lead 391 and the potential at the output-terminal lead 393. To utilize this potential to adjust the water control, a single-stage transistorized amplifier 532 is used. The output-leads 395 and 393 from the amplifier 532 are connected in series in the water-batching circuit. Lead 395 is connected to the coupling-transformer 302a of the batch-brain 112a of the water circuit A, by means of lead 369, where it opposes the voltage supplied by the water-material potentiometer 114 in a bucking fashion and thus it will subtract a voltage-value equivalent to that correct number (222) of lbs. of water. Lead 393 is connected through the batch selector-switch 151 to the water-material potentiometer 140. The amplifier 532 is of the adjustable-gain type since, in normal operations, the water scale-drum 135 will have a range of approximately 2000-lb. scale, whereas an aggregate-drum 135 may have to show 10,000, 15,000, or 30,000 pounds. When 222 lbs. of sand are added on a 10,000-lb. scale, it represents only 22.2 divisions at 10 lbs. per division. This amounts to some fixed quantity of angular rotation of the sand scale-drum 135, or so much of rotation of its scale-drum potentiometer 114. If an equal amount of rotation were applied to the water scale-drum 135, the result would not be 222-lbs. but, rather, 22.2-divisions; if the divisions are on a 2000-lb. scale, they are only 2 lbs. each, so the result would be only 44.4 lbs. Therefore, the amplifier 532 would be adjusted for a 5-to-1 step-up ratio in this example, and the 0.222 volts in the amplifier input would become 1.1-volts in he output-leads 393 and 395, instead of 0.222-volts. A transformer with a suitable step-up ratio could be used in place of the amplifier 532, but it would have the disadvantage of possible feed-back from the water-circuit to the sand-circuit.

The voltage applied to the water-control batch brain 112a consequently drives the water scale-drum potentiometer 114 back 111 divisions to reduce, by the amount of rotation equivalent to that many divisions, the set-up resistance value for the water as required in the batch formula.

On FIG. 1A a batch hold-switch 450 is shown connected between contacts 414 and 447 in lead 357, which is a hold-line. The hold-switch 450 permits the batching of dry ingredients without any water, if desired, by isolating the water-batcher. In other words, it breaks the circuit to the underweight-relay 304a on the water batch-brain 112a when the switch 450 is open.

Isolation diodes 435 and 436 are connected in lines 357 and 215 and control the flow of current in these leads to prevent current flowing to the water-gate relay 228 from the lead 215 of the underweight-relay 304b of the batch-brain 112b, when the water has been weighed out but the cement has not, or vice versa.

*The electronic comparing means or "batch-brain"*
*(FIG. 6)*

Turning now to FIG. 6, the schematic circuit diagram of the batch-brain 112 used in circuits A, B, and C is shown in detail. The center-tapped power-transformer 58 (e.g. 26-volts, 400-cycle), shown in FIG. 1B, supplies power to each batch-brain 112 through end-leads 66 and 67, the center-tap 63 being grounded so that each of the leads 66 and 67 supplies an alternating current of equal voltage. However, since these voltages are supplied from opposite ends of the supply-transformer 58, they are in an opposite-phase relationship. As shown in FIG. 6, the first power-lead 66 branches at a junction 550. One lead 551 from the junction 550 goes through a diode-rectifier 552 to a junction 553, from which a lead 554 extends to ground through a first filter-condenser 555 (e.g. 10 microfarads, 25-volts). The junction 553 also is connected to a resistance capacity filter-network comprising a first resistance 556 (e.g. 1000 ohms), and a second larger resistance 557 (e.g. 15,000 ohms), between which is a junction 558 from which a lead 559 extends to ground through a second filter condenser 560 (e.g. 10 microfarads, 25-volts). The resistor 557 is connected to a junction 561, which is connected by a lead 562 to the collector 563 of an NPN-type transistor 564, (e.g. 2N169A).

From the junction 558 between the resistors 556 and 557, there is also a lead 565 connected through a relatively large resistance 566 (e.g. 100,000 ohms) to a junction 567, from which another lead 568 passes to ground through a somewhat smaller resistance 569 (e.g. 3900 ohms) to form a voltage-dividing network. This network affords a bias-voltage to the base of the transistor 564 by way of the lead 300 that is connected to the secondary-winding of the input or coupling-transformer 302; the lead 301 is connected through an isolation-resistor 570 (e.g. 470 ohms) and a junction 571. Simultaneously, a considerably higher voltage is being applied on the collector 563 of the transistor 564 through the lead 562 and the 15,000-ohms resistance 557.

A feed-back or regeneration-circuit is provided by connecting the junction 571 through a condenser 572 (e.g. 10 microfarads, 25-volts) to a junction 573. The emitter 574 from the transistor 564 is connected by a lead 575 to the junction 573, from which point a lead 576 goes through a resistance 577 (e.g. 1000 ohms) to ground and a lead 578 goes through a condenser 579 (e.g. 40 microfarads, 4-volts) to ground. The condenser 579 serves to bring the transistor 564 into its proper operating range so that it will function as an audio-amplifier, as will be described below.

The junction-point 561 is also connected by a lead 580 to a junction-point 581. From this junction 581 a first-lead 582 goes through a coupling-condenser 588 (e.g. 10 microfarads and 10-volts) to the base 583 of a first relay transistor 584, and a second-lead 585 is connected through a coupling-condenser 589 (e.g. 10 microfarads and 10-volts) to the base 586 to a second-relay transistor 587. Both the relay transistors 584 and 587 are preferably of the PNP-type (e.g. 2N241A). From each lead 582, 585 a lead 590 or 591 goes to ground through a diode-rectifier 592 or 593.

Going back to the junction 550, another lead 595 goes from there to a diode-rectifier 596 which is grounded through a voltage-stabilizing resistance 598 (e.g. 10,000 ohms) and which is connected by a lead 597 to a junction 599. The junction 599 is connected through a resistance 600 (e.g. 3300 ohms) to the collector 601 of the first-relay transistor 584.

The other incoming lead 67 to the batch-brain 112 from the power-transformer 58 supplies voltage through a rectifier 602 which is grounded through a voltage-stabilizing resistance 603 (e.g. 10,000 ohms) and connected by a lead 604 to a junction 605. The junction 605 is connected through a resistance 606 (e.g. 3300 ohms) to the collector 607 of the second-relay transistor 587.

The relay-transistors 584 and 587 each have an emitter 608 or 609, with leads 610 and 611 connected through a stabilizing-resistance 612 to ground.

From the collectors 601 and 607 of the relay-transistors 584, 587, leads 613 and 614 are connected, respectively, to the underweight and overweight relays 304 and 303. The junction-point 599 is also connected to the underweight-relay 304 by a lead 615, a diode 616, and a lead 617. Similarly, the junction 605 is connected to the overweight-relay 303 by a lead 618, diode 619, and lead 620. The diodes 616 and 619 allow passage of negative supply-voltage to their respective relay-coils 304 and 303. Additional diodes 621 and 622 respectively between the leads 617 and 613 and between the leads 620 and 614, which serve to quench the back-EMF-surge which is caused when the relays 304, 303 are de-energized. A large back-surge from the collapse of the magnetic field of these relays would damage the transistors 584 and 587 if the diodes 621 and 622 were not there. Between each of the pair of leads 617 and 613 and the leads 620 and 614 is connected a condenser 623 or 624 (e.g. 10 microfarads, 25-volts), each of which serves as a filtering means to prevent chatter at the frequency of the supply-voltage.

To understand the unique function of the batch-brain 112 of the present invention, it must be understood that a phase-relationship exists between the input from the power-transformer 58 and the input from the coupling-transformer 302. Two voltages are supplied to the primary-winding of the transformer 302. Considering as one example the cement batch-brain 112b, the transformer 302b is supplied : (1) from the master scale-potentiometer 114 through the lead 113, the switch contacts 107 and 103, and the lead 111, returning to the master-potentiometer 114 by the lead 369, the primary winding 542 of the transformer 543 (FIG. 4), for the in-air compensation component 110b, and subsequently contact 102 which is shown not connected in FIG. 1 since the switch is closed to the left; and (2) from the material-potentiometer 141 through the lead 229. Both these voltages are being supplied from the same power-source, namely the transformer 68, shown in FIG. 1. The same thing is true of the batch-brains 112a and 112c. Thus at any given instant, if one such voltage supplied to the primary of the transformer 302b is greater than the other, one end of the primary-winding will be + (plus) and the other end will be − (minus). For example, if at that time the master-scale potentiometer 114b is set at its zero-weight, no resistance condition, and if the material-potentiometer 141 is set at any point upon the scale, for example at 5 volts, then the end of the primary-winding connected to the material-potentiometer 114b becomes positive and the other end of the primary connected to the scale-potentiometer 141 becomes negative. This is exactly what happens in an underweight situation. Conversely, if the scale-potentiometer voltage is greater than the material-potentiometer voltage, an overweight condition arises, and the current at the same relative instant flows in the opposite direction through the primary-winding; thus the phase in the secondary-winding of the transformer 302b is reversed.

Turning again to the power-transformer 58, A.C.-voltage is supplied equally through its output-leads 66 and 67 and in the batch-brain 112b the current in these leads is rectified by the diodes 596 and 602 to form a pulsating D.C.-voltage. Since the voltage from the opposite end-leads of a transformer are always in opposite-phase relationship, the pulsating D.C. produced is applied to the transistors 584 and 587 in alternate negative half-wave cycles. In other words, the pulses of D.C.-voltage arrive at the collectors 601 and 607 of the transistors 584 and 587 at exactly the opposite times. Thus, for example, at a particular instant when the voltage in the lead 66 is negative, the voltage in the lead 67 will be positive. Therefore, a negative-voltage will appear at diode 596 and on the collector 601, while the positive voltage coming in via the lead 67 will be blocked by the diode 602 and cannot get through; so there will be no voltage applied to the collector 607 of the transistor 587. On the next half-cycle, the polarities of the leads 66 and 67 will be reversed, and the transistor 587 will be supplied with voltage and the transistor 584 will not.

As described above, the incoming A.C.-signal supplied through leads 300 and 301 of the coupling-transformer 302 has one-half of its pulse positive and one-half negative, and the phase is dependent on the flow of current through the transformer primary-winding. At the same time, A.C.-power supplied from the power-lead 66 through the lead 551 is rectified through the diode 552, filtered through the filter network comprising the resistances 556 and 557 and the condensers 555 and 560, producing a direct-current voltage at the junction 558. This direct-current voltage flows through the voltage-divider formed by the resistances 566 and 569 and then out through lead 300 into the secondary of the coupling transformer 302. The voltage-divider, by virtue of the ratio of the resistance 569 to the resistance 566, produces a bias-voltage which will go through the secondary-winding of the transformer 302 and return to the base of the transistor 564; at the same time, a considerably higher voltage is being applied to the collector 563 through the resistance 557.

Now, the A.C.-signal applied into the coupling-transformer, due to the imbalance of the master-scale potentiometer 114 and the material-potentiometer 141, causes current to flow one way or another through the primary-winding, resulting in raising or lowering the bias-voltage on the base of the transistor 564. In other words, this input from the coupling-transformer 302b either is added to or subtracted from the actual D.C.-voltage biased onto the base of the transistor 564, and thereby causes a greater or less flow of current through the emitter 574, to ground. The more current that flows, the more the voltage will drop at the junction 561. Since, that voltage at junction 561 is a fairly high value, it will fluctuate according to how much current is being drawn through the transistor 564, and as it fluctuates it supplies the coupling-condensers 588 and 589, which act as rectifiers and supply negative-voltage only to the bases 583 and 586 of the relay transistors 584, 587. Any stray positive-current at the bases 583 and 586 is passed to ground through the diodes 592 and 593, so that when current flows from the coupling-transformer 302 and the junction 561, a pulsating-D.C. is applied to the bases 583, 586 of the transistors 584 and 587. Since the phase of these pulses is dependent on the direction of flow through the coupling-transformer 302, in one direction the negative-pulses are in phase with the alternately pulsating D.C. being supplied to the underweight-relay 304 and when in the opposite direction the phase of the input-voltage is shifted and is in phase with the supply-voltage of the overweight-relay 305. When the supply-voltage to the collector of a transistor is in-phase with the input-voltage to its base, then an output is produced from that transistor. The output-leads 613 and 614 are connected to the underweight and overweight relays 304 and 303, respectively, and current is supplied to operate these relays when the phase-relationship is present to produce an output from one of the relay-transistors 584, 587.

Therefore, as the weighing process proceeds for each ingredient, the voltage through a material-potentiometer (e.g. 144) to its coupling-transformer 302c is greater than the voltage through the master scale-drum potentiometer 114 to the opposite end of the coupling-transformer 302c and, as described above, this causes the underweight-relay 304 on the batch-brain 112c to energize or "pull in." As long as the underweight condition remains the relay 304 will remain energized and close its contact 467 in line 412. When the voltages to the batch-brain 112c from the material-potentiometer 144 and the master scale-drum potentiometer 114 become equal, the underweight-relay will drop out and, if too much material is poured into the weigh-hopper, the phase-shift occurs in the coupling-transformer 307c and the overweight-relay 303 will be energized.

Operation

The operation of the batch-control system of the present invention now will be summarized, starting with the setting-up procedure for a desired formula. First, the batch-selector switch 151 is set to the desired formula which, in FIGS. 1A and 1B, closes the switch-arms 381, 385, 392, 150, 241, 394, and 417. Then all the manual batch-set switches 95 of circuits A, B, and C are placed in the "set"-position, which is with the switch-arms 96, 97 and 98 pivoted to the right in FIGS. 1A and 1B. By throwing the switches 95 into "set"-position, the input to each of the servo-amplifiers 120 is being supplied from its master scale-drum potentiometer 114 through the lead 113, the switch-arm 98, the contact 104, the resistor 115, the lead 108, the switch-arm 96, and the lead 117. Also, voltage is being supplied from the associated material-potentiometer 140, 141, 142, 143, or 144 through a lead 369 or 370 and the lead 109, the switch-arm 97, and the lead 118.

The power which supplies the voltage through each scale-drum potentiometer 114 and each material-potentiometer 140, 141, 142, 143 and 144 is supplied by the variable-tap transformer 68. All the scale-drum potentiometers 114 are connected in parallel across the ten-volt alternating-current lines 75 and 76 from the transformer 68, and a total of thirty volts is normally supplied across the leads 74 and 70, the lead 74 being connected through the proportional-batch control 77 and the leads 80, 152, 153 and 210 to all five of the material-potentiometers 140, 141, 142, 143 and 144. Thus, normally the voltage across each of the material-potentiometers 140, 141, 142, 143 and 144 is the same as that through the scale-drum potentiometers 114; for fractional batches, the proportional-control 77 is used.

Referring to the aggregates-circuit C in particular, with the switch 95 in the "set"-position, the material selector-switch 373 is set manually for aggregate-two, represented by the material-potentiometer 144. Thus, current flows from the lead 153 through the material-potentiometer 144, the lead 172, the switch-arm 381, the lead 380, the material-selector switch-arm 372, the lead 370, the in-air compensation component 110c, the lead 109, and through the batch-set switch-arm 97, out the lead 118 into the servo-amplifier 120. The shaft 149 of the material-potentiometer 144 then is rotated manually, causing an immediate imbalance between this signal, from the material-potentiometer 144 to the servo-amplifier 120, and the signal from the associated master scale-drum potentiometer 114 to the servo-amplifier 120. Hence, an output voltage from the servo-amplifier 120 is produced and is supplied to the servo-motor 130 to drive the scale-drum potentiometer 114 until its resistance equals that of the material-potentiometer 144. The operator watches the drum 135 as he turns the shaft 149, and he keeps turning the shaft 149 until the drum 135 indicates the weight of aggregate-two that is called for by the batch formula. Then the potentiometer 144 is properly set.

Next, the material-selector switch 373 is turned to aggregate-one, represented by the potentiometer 143, and the procedure is repeated, the master scale-drum potentiometer 114 following the potentiometer 143; the scale drum 135 will now show the total weight-setting of both aggregate-two and aggregate-one; so the process is additive, the potentiometer 114 being nulled-out as its total resistance equals that of the combined material-potentiometers 144 and 143. At any point during the set-up procedure, the amount of material represented by any one potentiometer can be adjusted by raising or lowering the resistance of that potentiometer. The material-potentiometer 142 for the sand is set in the same manner, the sand-weight being additive; so with all the material potentiometers 142, 143, and 144 set to their prescribed values, the indicating scale-drum 135 and the master scale-drum potentiometer 114 are in a position corresponding to the cumulative total weight of the aggregates prescribed by the formula.

The material potentiometers 140 and 141 for the water and cement in circuits A and B (FIG. 1A) are set by the same procedure as that by which the potentiometer 144 was set and, as explained previously, it is preferred that each of them has its own servo-amplifier 120, servo-motor 130, master-scale potentiometer 114, and indicating scale-drum 135.

Prior to the setting-up procedure, the partial batch-control 77, the moisture-compensation control 390, and the in-air compensation controls 110a, 110b, and 110c should be adjusted to the desired settings. The functions of these components already have been discussed, and therefore they will not be reiterated now.

As described previously with reference to FIG. 2, a plurality of batch-formulae can be pre-set by having more than one series of material-potentiometers, each series representing a formula-"strip." Thus, by actuation of the batch-selector switch 151, any one of the series can be connected into the batching-circuit to control the weighing-out of the various ingredients.

Now, with the material-potentiometers 140, 141, 142, 143, and 144 set, the batching procedure can commence. The batch-set switches 95 are now manually moved to the "batch"-position, with the arms 96, 97 and 98 against their left-hand contacts, thereby connecting each servo-drive system in the circuits A, B, and C to the control-transmitters 90 on each of the weigh-hoppers 20, 21, 22 and returning each master scale-drum potentiometer 114 and its connected indicating scale-drum 135 to its no-resistance, zero-indicating position to match the no-weight condition in each of the empty weigh-hoppers.

When power is originally applied to leads 33 and 34, the input power-leads to the system, power is applied to the batch-brains 112a and 112b through leads 66 and 67 and their underweight-relays 304 are energized.

Next, the manual start-dump switch 330 is thrown, and current flows from the power-leads 342 and 343 to the relay-coil 311 of start-relay 310. The switch-arms 313, 314, 315 and 316 of the relay 310 are then moved to the left, from the position shown in FIG. 1B. When momentarily actuated, the start-relay 310 is latched-in by the self-holding contacts 313 and 317 supplying power to the relay-coil 311. Power for this purpose (e.g. 24-volt D.C.) is supplied from the lead 37 through the junction 125, the switch-arm 315, the leads 332 and 449, the leads 434 and 415, the energized underweight-relays 304 of the batch-brains 112a and 112b, the leads 357 and 334, the switch-arm 313 and the leads 322 and 323, the start-hold relay-coil 311, and the return-leads 324 and 54. Simultaneously, the current available at arm 414 and lead 357 of underweight relay 304a actuates gate-relay 228 through lead 505; thus current flows to the solenoid valve 31 on the water-supply hopper 26. Also, current available at lead 215 from underweight-relay 304b activates either gate-relay 237 or 239 through leads 248, batch-selector switch 151, and cement-selector switch 176, to energize the solenoid valve 31 for the cement-supply hopper 27.

Before the switch 330 is closed, power at 125-volts is supplied from the lead 37 via the lead 123 from the junction 125 and the lead 487 through the contacts of the overweight-relays 303 of all the batch-brains 112, returning through the leads 490 and 342 and contact 343. The master interlock-relay 337 is energized at this time through the lead 341 and the lead 336, the switch-arm 314, the contact 320, the lead 135, and the lead 36. When the interlock-relay 337 is thus energized, the switch-arm 338 does not engage its contact 340 and no current flows from the contact 340 to the gate interlock-relays 206, 207, 208, 239, 237 and 228, so that the gate interlock-relays 482 are de-energized and the gate-relays 481 are ready for subsequent energization. Normally, the gate interlock-relays are set before batching commences and the master interlock-relay 337 merely provides a means to reset them, once the weighing-out of all materials has been completed and the start-relay coil 311 has been de-energized. When the start-relay coil 311 is energized, the master interlock-relay 337 is de-energized and current can pass by circuit elements 37, 331, 338, 339, 340, 493, 495 to the gate interlock-relays. Since the interlock-relay 482 (FIG. 5) is de-energized, the switch-arm 486 is against the contact-arm 503; so (as will be shown later) the gate-relay 481 can be energized, at which time the condenser 512 is charged so that the de-energized interlock-relay 482 is ready to perform its function when the gate-relay 481 is again de-energized.

With the start-relay 310 energized and latched-in, and with power being supplied from the variable-transformer 68 through the material-potentiometers 140, 141, 142, 143 and 144, which have been pre-set to the desired amount of resistance, and through the master scale-drum potentiometers 114, which are at zero since the weigh-hoppers are empty, the batch-brains 112a and 112b provide an underweight condition for the water and cement. Therefore, the batch-brains 112a and 112b actuate their underweight-relays 304, and the weighing-in process begins.

In the aggregates-circuit C, the stepping-switch 190 is originally in its "home"-position which, in the second-stage 399, means that the center-contact 404 is engaging the contact 398 and therefore is connected by the lead 400 to the zero-balance circuit 401, comprising the resistances 402 and 403. This zero-balance circuit creates an artificial zero-weight condition so that even if a small amount of material is still in a weigh-hopper (thereby preventing the master scale-potentiometer 114 from being bottomed on absolute zero), the overweight-relays 303 will pull in and prevent the starting of a new batch. Also, if for any reason one weigh-hopper 20, 21 or 22 has not been dumped, the overweight-relays 303 will pull in and prevent such starting.

Now, when current is applied through the underweight-relay circuit, through the circuit elements 37, 331, 315, 318, 32, 455, 457, 357, 414, 305 (in A) and 415, 417, 305 (in C), it flows through the lead 412 to the pulse relay-coil 420. In going through that coil and trying to reach its ground through the leads 431 and 36, it comes to the condenser 425 which normally is discharged. Since it is discharged, it draws heavy current, momentarily, to charge itself and as it does this it momentarily energizes the pulse relay-coil 420 and moves the switch-arms 422 and 423 to the left, thereby disengaging the contact 429 and engaging the contact 437. This momentarily completes the circuit from the lead 434 (coming from the lead 415) through the switch-arm 423, the lead 438, the hold-restart switch-arms 441 and 442, and the lead 451 to the stepping-switch coil 410, cocking but not moving the stepping-switch 190. As the capacitor 463 approaches full charge, the pulse-coil 420 is de-energized and so is the coil 410, and the spring of the stepping-switch 190 drives the first, second, and third stepping-switch stages 399, 405 and 406 ahead one notch.

The first section 405 of the stepping-switch 190 moves its contact 460 to engage the contact 199, which is connected by the lead 198 to the skip-switch contact 197; the contact 464 of the second stage 399 engages the contact 379, which is connected by the lead 380 through the batch-selector switch-arm 381 and the lead 172 to the material-potentiometer 144; and the third stage 406 engages the contact 468, which is connected by the lead 471 to the gate-relay 206. Voltage from the leads 80, 152 and 153 passes through the material-potentiometer 144 to the contact 379 and thence through the step-switch second stage central-contact 464 and the lead 465 to the coupling-transformer 302c of the batch-brain 112c. Simultaneously, voltage in the circuit C from the lead 76 is being supplied through the master scale-potentiometer 114 by the lead 113, the switch-arm 98, and the lead 111 to the other end of the primary-winding of the coupling-transformer 302a. At this time underweight-relay 304c is energized, causing current to flow through contact 467 and lead 466 to section 406 of the stepping-switch, contact 468, lead 471 to the gate-relay 206, thus opening the solenoid-valve 31 on the aggregate-one supply-hopper 28.

When the null-point is reached between the two input-voltages to the coupling-transformer 302a, its associated underweight relay 304 will drop out and its switch-arm 305 will close the circuit through the lead 412, the pulse-relay 420 again will be energized, and the stepping-switch 190 will advance to the next material-potentiometer 143 and start the weighing-cycle for aggregate-two. When that is completed, the sand-potentiometer 142 is put into its cycle. When all the materials have been weighed out, the stepping-switch 190 will be advanced by the same means to its home-position 398 and, due to the zero-balance circuit 401, an artificial overweight-condition will be maintained to prevent the starting-relay 310 from being energized and advancing the stepping-switch 190 again.

In its neutral or "home"-position, the stepping-switch first-stage 405 mechanically breaks the contact between the two mechanically-linked switch-arms 456 and 457 with their leads 458 and 357 which, during the weighing process, have connected the lead 332 with lead 357, which connects to a junction 356 in the interlock return-line 334 which is connected to the contact 317 and, through switch-arm 313, to the start-relay coil 311. However, during the weighing-out process, the start-relay 310 is also held in by the current flowing through the closed underweight-relays 304 for the water and cement circuits A and B, which are also connected through the lead 334, as well as by the normally closed contact-arm 457. Current from any of these sources is sufficient to keep the start-relay coil 311 energized and the start-relay 310 held-in; but when the weighing-out is completed, no current flows to the start-relay coil 311, since the contact-arm 457 has been moved to break the circuit from the first step-switch stage 405 and the underweight-relays 304 have dropped out on the water and cement circuits A and B. So, now the start-relay 310 moves to the right and the switch-arm 316 closes against the contact 321, and current is available from the power-lead 34, lead 345, the switch-arm 316, and the contact 321 through the lead 347 and switch-arm 349 to the dumping-solenoids 25 on each weigh-hopper 22. The batch-dump switch 330 can now be moved to the "dump"-position to dump the weighed-out ingredients.

As the batching-cycle starts, each underweight-relay 304 pulls in; for example, on the aggregates-circuit C current flows through the lead 466 to the center-contact of the third-stage 406 of the stepping-switch 190 and from there to the contact 468 and the lead 471 on the gate interlock-relay 206. The lead 471 (see FIG. 5) is connected to the gate-coil 481 which receives its ground from the lead 508 through the lead 506, the switch arm 486 on the interlock-relay 482 of the same chassis, and the lead 507. So when current is applied, the upper gate-relay 481 will be energized and the switch-arms 483 and 484 will be moved outwardly. The switch-arm 483 closes a circuit from the input power-lead 359 through the lead 497 to the main-power ground-lead 498 and through the lead 480 to the gate-solenoid 31 on the material supply-bin 28. This signal to the gate-solenoid 31 opens the flow-gate 29 and the material commences to flow from the material-bin 28 into the weigh-hopper 22.

At the same time that the relay 481 is closed, to energize the gate-solenoid 31 on the material-supply bin 28, current from the lead 37 is applied through the leads 331 and 339; the main interlock-relay switch-arm 338, the contact 340 and the leads 493 and 495 to each of the gate interlock relays 206, 207, 208, 239, 237 and 228. When the gate-relay 481 has been energized, then current flows from the lead 495, through the lead 509 and resistor 510, the switch-arm 484, the lead 511 to the condenser 512, which is connected by the leads 513 and 514 to the ground-lead 508. The condenser 512 is charged, while the material is being poured into its weigh-hopper 22.

When the amount of material in the weigh-hopper 22 equals the pre-set amount, no current flows from the step-switch 406 to the lead 471, since the underweight-relay 305 on the batch-brain 112 has dropped out. Thus the arms 483 and 484 on the relay 481 return to their de-energized condition, thereby breaking the contact between the leads 359 and 497 to the gate-solenoid 31, causing the supply-gate 29 on the material-bin 28 to close. When the relay 481 is de-energized, the charged condenser 512, being connected by the lead 511, switch-arm 484, and leads 515 and 516 to the interlock relay 482, will discharge through it and leads 517, 514, and 508 and thus energize the relay 482. The relay 482 then causes the switch-arms 485 and 486 to move outwardly to their respective contacts 502 and 504. Then current from the lead 495 flows through lead 520, the switch-arm 485, and the leads 521 and 516 to the relay-coil 482 and from them, as before, by leads 517, 514, and 508 to ground, to thus latch it in the energized position. With the relay 482 energized and the switch-arm 486 away from the contact 503, the relay 481 circuit through the lead 506, the switch 486, the lead 507, and the lead 508 is broken. Therefore, once the underweight-relay 34 drops out and the gate-relay 481 is closed, it cannot be re-opened again during the same batching. This feature of the invention prevents any fluttering of the scale as it comes up to the prescribed weight; the instant the null-point is reached, the gate-relay will be locked-out for the balance of the batch.

Of course, in the aggregates-circuit C, after the underweight relay 304 has dropped out, current is supplied again to the pulse-relay 420 and the stepping-coil 410 is actuated to advance it to the next material. A new underweight-condition is thus established and the weighing sequence starts over again.

As mentioned previously, when a new batching-cycle commences, current is supplied through all of the overweight-relay contacts, and if all are de-energized the power is then supplied to the master interlock-relay 337, which then breaks the back-contact 340 and stops the flow of power through the leads 495 in all of the gate interlock-relays. This resets these interlock-relays to the un-latched-position, ready to commence another batching cycle.

With the present invention, sequential weighing-out of a plurality of materials can be performed automatically and rapidly with the maximum of efficiency, safety, and accuracy. The manual manipulations required by the operator are few in number and yet the present invention provides a new versatility in batching, whereby any one of a number of predetermined batch formulae can be weighed out. Also, the novel combination of elements in the system permits the necessary compensation corrections to be applied easily with reliable and accurate results, since the basic concept of the system's operation provides for the unique integration of these compensation means.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a weighing apparatus having a weigh-hopper, material supply means for said weigh-hopper, valve means on said material supply means, and scale means for said weigh-hopper; the combination of an electrical circuit having a power source and control-switch means; a master potentiometer means associated with said weigh-hopper; an indicator means calibrated in pounds and mechanically connected to said master potentiometer means servo-drive means connected with said scale means on said weigh-hopper to move said master potentiometer means so that its resistance value is constantly proportional to the weight of material in said weigh-hopper; an adjustable potentiometer means for use with said indicator means to pre-set a value to be obtained by said master potentiometer means to correspond to a predetermined weight of material to be weighed into said weigh-hopper; means for opening the valve means for said weigh-hopper when said control-switch means is closed; and valve-closure means actuated by said master potentiometer means when it attains the said predetermined value for closing said valve means thereby stopping the flow of material into said weigh-hopper when said resistance value indicates that the predetermined weight has been weighed out.

2. The device described in claim 1 including means to compensate for the material still in the air between the weigh-hopper and the material-supply means when said valve means is closed, comprising: a transformer having a primary and secondary winding; said primary winding having a means to vary its voltage input; and said secondary winding being in series with said adjustable potentiometer means to vary its preset resistance value.

3. In a weighing apparatus having a weigh-hopper, material supply means for said weigh-hopper, valve means on said material supply means, and scale means for said weigh-hopper; the combination of an electrical circuit having a power source and control-switch means; variable-resistance means in said circuit; means connected with said scale means on said weigh-hopper to move said variable-resistance means so that its resistance value is constantly proportional to the weight of material in said weigh-hopper; a drum indicator connected to said variable resistance means; means for use with said drum indicator to pre-set a value to be obtained by said variable-resistance means to correspond to a predetermined weight of material to be weighed into said weigh-hopper; means for opening the valve means for said weigh-hopper when said control-switch means is closed; and valve-closure means actuated by said variable-resistance means attaining said predetermined pre-set value for closing said valve means to stop the flow of material into said weigh-hopper when said resistance valve indicates that the predetermined weight has been weighed out.

4. In a weighing apparatus having a weigh-hopper with scale means and material supply means, the combination of an electrical circuit having a master potentiometer and indicator means mechanically linked thereto; servo-drive means connected with said scale means to move said master potentiometer so that its resistance value is constantly proportional to the weight of material in said weigh-hopper; an adjustable resistance means including said indicator means to pre-set a resistance value on said adjustable resistance means, which when obtained by said master potentiometer, will correspond to a predetermined weight of material to be weighed into said weigh-hopper; means actuated by said master potentiometer attaining said predetermined resistance value for stopping the flow of material from said material supply means into said weigh-hopper when said resistance value corresponds to said predetermined weight of material; and adjustable means connected in the said electrical circuit for varying the actual time for stopping the flow of material from said material supply means to compensate for the material still in the air between said material supply means and said weigh-hopper after the gate valve of said material supply means is closed.

5. In a weighing apparatus having a weigh-hopper, material supply means for said weigh-hopper, valve means on said material supply means, and scale means for said weigh-hopper; the combination of an electrical circuit having a power source and control-switch means; variable-resistance means associated with said weigh-hopper; means connected with said scale means on said weigh-hopper to move said variable-resistance means so that its resistance value is constantly proportional to the weight of material in its said weigh-hopper; a plurality of adjustable fixed-resistance means; means including an indicator drum mechanically connected to said variable resistance means to pre-set the resistance value of each adjustable-resistance means to correspond to a predetermined weight of material to be weighed into said weigh-hopper; selector-switch means to switch any one of said pre-set fixed-resistance means into said electrical circuit; means for opening the valve means for said weigh-hopper when said control-switch means is closed; and valve closure means actuated by said variable-resistance means attaining a resistance value equal to said pre-set fixed-resistance value for closing said valve means to stop the flow of material into said weigh-hopper.

6. In a batching plant having a plurality of individual weigh-hoppers to weigh out predetermined amounts of several ingredients for a batch, a material-supply means for each weigh-hopper, valve means on each material-supply means, and scale-means for each weigh-hopper; the combination of a batch-selection-and-control mechanism comprising: a central control circuit having a main power source and controlled by master-switch means; separate batching-control circuits to control the weighing-out of each ingredient, said separate circuits being connected in parallel in said central control circuit and comprising: variable potentiometer means associated with a said weigh-hopper, means connected with said scale means on said weigh-hopper to move said variable potentiometer means so that its resistance value is constantly proportional to the weight of material in its said weigh-hopper, adjustable fixed-resistance means, means including a rotary drum indicator means mechanically connected to said variable potentiometer means, to adjust said fixed-resistance means to a pre-set value corresponding to a predetermined weight of material to be weighed into said weigh-hopper, means for comparing the resistance values of said variable potentiometer and said fixed-resistance means, means for opening the valve means for its said weigh-hopper when said master-control switch is closed, and valve-closure means actuated by said comparing means for closing said valve means to stop the flow of material into said weigh-hopper when the comparison of said resistance values indicates that the predetermined weight has been weighed out.

7. The batching plant of claim 6 including a single control means comprising an adjustable transformer means connected between said power source and said adjustable fixed resistance means to vary the voltage through all of said fixed-resistance means simultaneously while maintaining a constant proportion between them, so as to change the size of the batch without changing its formula.

8. In a batching plant having a plurality of individual weigh-hoppers to weigh out predetermined amounts of several ingredients for a batch, a material-supply means for each weigh-hopper, valve means on each material-supply means, and scale means for each weigh-hopper; the combination of a batch-selection-and-control mechanism comprising: a central control circuit having a main power source and controlled by master-switch means; separate batching-control circuits to control the weighing-out of each ingredient, said separate circuits being connected in parallel in said central control circuit and comprising: variable potentiometer means associated with a said weigh-hopper and indicator means mechanically connected to said variable potentiometer means; means connected with said scale means on said weigh-hopper to move said variable potentiometer means so that its resistance value is constantly proportional to the weight of material in its said weigh-hopper; adjustable fixed-resistance means including said indicator means; means to adjust said fixed-resistance means to a pre-set value corresponding to a predetermined weight of material to be weighed into said weigh-hopper, means for comparing the resistance values of said variable and fixed resistance means; means for opening the valve means for its said weigh-hopper when said master-control switch is closed, valve-closure means actuated by said comparing means for closing said valve means to stop the flow of material into said weigh-hopper when the comparison of said resistance values indicates that the predetermined weight has been weighed out, and interlock means in said central control circuit for each ingredient to prevent dumping until all said ingredients have been weighted out.

9. In a batching plant having a plurality of individual weigh-hoppers to weigh out predetermined amounts of several ingredients from a material-supply means for each weigh-hopper, valve means on each material-supply means, and scale means for each weigh-hopper; the combination of a batch-selection-and-control mechanism comprising: a central-control circuit having a main power source and controlled by master-switch means; separate batching-control circuits to control the weighing out of each ingredient, said separate circuits being connected in parallel in said central-control circuit and each having variable-resistance means associated with a said weigh-hopper, a visual indicator means connected to said variable-resistance means and means connected with said scale means on said weigh-hopper to move said variable-resistance means so that its resistance value is constantly proportional to the weight of material in its said weigh-hopper; a plurality of sets of fixed-resistance means, each set having at least one fixed-resistance means; means including said indicator means for adjusting said fixed-resistance means to a value corresponding to a predetermined weight of an ingredient to be weighed out; means for selecting any one of said sets for use at any one time; means in each separate circuit for comparing the resistance values of the variable and fixed resistance means therein; means in each separate circuit for opening the valve means for its said weigh-hopper when said master control-switch is closed; and valve-closure means in each separate circuit actuated by said comparing means for closing said valve means to stop the flow of material into said weigh-hopper when the comparison of said resistance values indicates that the predetermined weight has been weighed out.

10. In a batching plant having a plurality of individual weigh-hoppers to weigh out predetermined amounts of water, cement, and at least one size of aggregate containing moisture to make up a batch of concrete, material-supply means for each weigh-hopper, valve means on each material-supply means, and scale means for each weigh-hopper; the combination of a batch-selection-and-control mechanism comprising: a central-control circuit having a main power source and controlled by master-switch means; separate batching-control circuits to control the weighing out of each ingredient, said separate circuits being connected in parallel in said central-control circuit and each comprising: a variable-resistance means associated with a said weigh-hopper and means connected with said scale means on said weigh-hopper to move said variable-resistance means so that its resistance value is constantly proportional to the weight of material in its said weigh-hopper, an indicator means linked to said variable-resistance means adjustable fixed-resistance means, means including said indicator means to adjust said fixed-resistance means to a pre-set value corresponding to a predetermined weight of material to be weighed into said weigh-hopper, means for comparing the resistance values of said variable and fixed resistance means, means for opening the valve means for its said weigh-hopper when said master-control switch is closed, and valve-closure means actuated by said comparing means for closing said valve means to stop the flow of material into said weigh-hopper when the comparison of said resistance values indicates that the predetermined weight has been weighed out; and moisture-compensation means in said aggregate circuit pre-settable to a known value of percentage-moisture-content in said aggregate, to provide automatically a voltage correction to the aggregate-batching circuit to increase the amount of aggregate weighed out and to provide simultaneously a voltage correction to the water-batching circuit to decrease the amount of water to be weighed out.

11. The batching-control mechanism as described in claim 10, wherein said moisture-compensation means comprises a first multiplying-transformer adapted to receive an input through said fixed-resistance means in said aggregate circuit and having a series of taps representing variations in aggregate moisture-content; selector-switch means to connect to any one of said taps to vary the output of said transformer; said transformer-output being connected to said resistance-comparing means in said aggregate batching circuit to cause the weighing-out of an increased amount of aggregate containing moisture; a second multiplying-transformer connected across said output of said first multiplying-transformer and also to said resistance-comparing means in said water-batching circuit; whereby the voltage output from said second-transformer is electrically opposed to the voltage input to said comparing means in said water-control circuit to thus effect a subtraction of the amount of water included as moisture in the aggregate.

12. In a batching plant having a weigh-hopper, a plurality of material-supply means for said weigh-hopper, each said material supply means having a valve to control the flow therefrom, and scale means for said weigh-hopper; the combination of an electrical circuit having a power source and control-switch means; a variable potentiometer means in said circuit; indicator means connected to said variable-potentiometer means; means connected with said scale means on said weigh-hopper to move said variable potentiometer means so that its resistance value is constantly proportional to the weight of material in said weigh-hopper; a plurality of weight-setting adjustable fixed resistance means, one for each material being weighed out, each said adjustable fixed resistance means being operably connectible with said variable-potentiometer means and its indicator means; single comparing means for comparing the resistance value of said single variable potentiometer means with any of said fixed-resistance means; means for closing an open valve-means for one of said material-supply means when a comparison of resistances indicates that the weigh-hopper has had a predetermined amount weighted out; and sequence means for automatically opening, one-at-a-time, a said valve-means for a said material-supply means at a time after said master control-switch is closed, until all said materials have been weighed out.

13. The device described in claim 12 wherein said sequence-means comprises a step-switch controlled by a step-switch relay; means to supply a pulse of current to said relay; and means associated with said comparing means to supply current to said pulsing means when the material being weighed out has reached its predetermined amount.

14. The device described in claim 12 including means connected in said electrical circuit to produce an adjustable voltage in series with said pre-set resistance value to compensate for the material in the air between the material-supply means and said weigh-hopper, when the flow of material from said material-supply means is stopped.

15. In a batching plant having a plurality of individual weigh-hoppers to weigh out predetermined amounts of several ingredients for a batch of concrete, material-supply means for each weigh-hopper, valve means on each material-supply means, and dial-scale means for each weigh-hopper, having a shaft adapted to rotate in proportion to the weight of material in each weigh-hopper; the combination of a batch-selection-and-control mechanism comprising: a batching control circuit to control the weighing out of each said ingredient, having a main power source and controlled by a master-switch means; a single variable-resistance means connected to each said dial-scale means and an indicator connected to each said variable-resistance means; a plurality of sets of weight-setting adjustable fixed-resistance means, means including said indicator for adjusting said fixed-resistance means to a value corresponding to a predetermined weight of an ingredient to be weighed out; means for selecting any one of said sets for use at any one time; single comparing means for comparing the resistance value of said single variable-resistance means with any of said selected fixed-resistance means; step-switch means to connect a first said fixed-resistance means to said comparing means; means for closing an open valve means for an ingredient supply-means when a comparison of resistances indicates that its weigh-hopper has had a predetermined amount weighed out; and means to control said step-switch to automatically and sequentially open, one-at-a-time, said valve means for an ingredient supply-means at a time after said master-switch means is closed, until all said ingredients have been weighed out.

16. In a batching plant having a plurality of weigh-hoppers to weigh out predetermined amounts of water, cement, and at least two sizes of aggregate to make up a batch of concrete, material-supply means for each weigh-hopper, valve means on each material-supply means, and scale means for each weigh-hopper; the combination of a batch-selection-and-control mechanism comprising: a central-control circuit having a main power source and controlled by master-switch means; three separate batching-control circuits to control the weighing out of (1) the water, (2) the cement, and (3) all the aggregates, said three circuits being connected in parallel in said central-control circuit; said water and cement control-circuits each comprising: a variable-resistance means associated with a said weigh-hopper, means connected with said scale means on said weigh-hopper to move said variable-resistance means so that its resistance value is constantly proportional to the weight of material in its said weigh-hopper, adjustable fixed-resistance means in parallel with said variable-resistance means, means including a visual indicator connected to said variable resistance means to adjust said fixed-resistance means to a pre-set value corresponding to a predetermined weight of material to be weighed into said weigh-hopper, means for comparing the resistance values of said variable and fixed-resistance means, means for opening the valve means for its said weigh-hopper when said master-control switch is closed, and valve-closure means actuated by said comparing means for closing said valve means to stop the flow of material into said weigh-hopper when the comparison of said resistance values indicates that the predetermined weight has been weighed out; said aggregates-circuit comprising a single variable-resistance means connected to said aggregate dial-scale means; a plurality of weight-setting adjustable fixed-resistance means, one for each aggregate; single comparing means for comparing the resistance value of said single variable-resistance means with any of said fixed-resistance means; means for closing an open valve-means for an aggregate material-supply means when a comparison of resistances indicates that its weigh-hopper has had a predetermined amount weighed out; and sequence means for opening, one-at-a-time, a said valve-means for a said aggregate material-supply means at a time after said master-control switch is closed, until all said aggregates have been weighed out.

17. In a batching plant having a plurality of weigh-hoppers to weigh out predetermined amounts of water, cement, and at least two sizes of aggregate to make up a batch of concrete, material-supply means for each weigh-hopper, valve means on each material-supply means, and scale means for each weigh-hopper; the combination of a batch-selection-and-control mechanism comprising: a central-control circuit having a main power source and controlled by master-switch means; three separate batching-control circuits to control the weighing out of (1) the water, (2) the cement, and (3) all the aggregates, said three circuits being connected in parallel in said central-control circuit; said water and cement control-circuits each comprising: a variable-resistance means associated with a said weigh-hopper, means connected with said scale means on said weigh-hopper to move said variable-resistance means so that its resistance value is constantly proportional to the weight of material in its said weigh-hopper, adjustable fixed-resistance means in parallel with said variable-resistance means, means including a visual indicator connected to said variable resistance means to adjust said fixed-resistance means to a pre-set value corresponding to a predetermined weight of material to be weighed into said weigh-hopper, means for comparing the resistance values of said variable and fixed-resistance means, means for opening the valve means for its said weigh-hopper when said master-control switch is closed, and valve-closure means actuated by said comparing means for closing said valve means to stop the flow of material into said weigh-hopper when the comparison of said resistance values indicates that the predetermined weight has been weighed out; said aggregates-circuit comprising a single variable-resistance means connected to all said aggregate dial-scale means; a plurality of weight-setting adjustable fixed-resistance means, one for each aggregate and its weigh-hopper; single comparing means for comparing the resistance value of said single variable-resistance means with any of said fixed-resistance means; means for closing an open valve-means for an aggregate weigh-hopper when a comparison of resistances indicates that its weigh-hopper has had a predetermined amount weighed out; and sequence means for opening, one-at-a-time, a said valve means for a said aggregate-weighing hopper at a time after said master-control switch is closed, until all said aggregates have been weighed out; and interlock means for each batch ingredient connected in said central-control circuit to prevent the weighing out of any more material after the predetermined weight has been weighed out and being energized to close a circuit to enable the dumping of said weigh-hoppers after all the ingredients have been weighed out.

18. In a batching plant having a plurality of weigh-hoppers to weigh out predetermined amounts of water, cement, and at least two sizes of aggregate to make up a batch of concrete, material-supply means for each weigh-hopper, valve means on each material-supply means, and dial-scale means for each weigh-hopper having a shaft that rotates in proportion to the weight of material in its weigh-hopper; the combination of a batch selection and control mechanism comprising: a central-control circuit having a main power source and controlled by master-switch means; three separate batching-control circuits to control the weighing out of (1) the water, (2) the cement, and (3) all the aggregates, said three circuits being connected in parallel in said central-control circuit; said water and cement control-circuits each comprising: a variable resistance means associated with a said weigh-hopper, servo-drive means connected with said dial-scale means on said weigh-hopper to move said master-potentiometer means so that its resistance value is constantly proportional to the weight of material in its said weigh-hopper, a drum indicator mechanically connected to said variable resistance means, adjustable fixed-resistance means in parallel with said variable-resistance means, means including said servo-drive means to adjust said fixed-resistance means to a pre-set value corresponding to a predetermined weight of material to be weighed into said weigh-hopper, means for comparing the resistance values of said variable and fixed-resistance means, means for opening the valve-means for its said weigh-hopper when said master-control switch is closed, and valve-closure means actuated by said comparing means for closing said valve-means to stop the flow of material into said weigh-hopper when the comparison of said resistance values indicates that the predetermined weight has been weighed out; said aggregates-circuit comprising a master-potentiometer means connected to said dial-scale means on said aggregates weigh-hopper by a third servo-drive means; a plurality of weight-setting adjustable fixed-resistance means, one for each aggregate and its supply-means, said resistance means being pre-settable by means of said servo-drive means and said drum indicator; single comparing means for comparing the resistance value of said single variable-resistance means with any of said fixed-resistance means; means for closing an open valve-means for an aggregate weighing-hopper when a comparison of resistances indicates that its weigh-hopper has had a predetermined amount weighed out; and sequence means for opening one-at-a-time said valve-means for a said aggregate weighing hopper at a time after said master-control switch is closed, until all said aggregates have been weighed out.

19. In a batching plant having a plurality of weigh-hoppers to weigh out predetermined amounts of water, cement, and at least two sizes of aggregate to make up a batch of concrete, material-supply means for each weigh-hopper, valve means on each material-supply means, and scale means for each weigh-hopper; the combination of a batch selection and control mechanism comprising: a central-control circuit having a main power source and controlled by master-switch means; three separate batching-control circuits to control the weighing out of (1) the water, (2) the cement, and (3) all of the aggregates, said three circuits being connected in parallel in said central-control circuit; said water and cement control-circuits each comprising: a master-potentiometer means associated with a said weigh-hopper, means connected with said scale-means on said weigh-hopper to move said master-potentiometer means so that its resistance value is constantly proportional to the weight of material in its said weigh-hopper, a drum indicator adjustable fixed-resistance means in parallel with said master-potentiometer means, means to adjust said fixed-resistance means to a pre-set value corresponding to a predetermined weight of material to be weighed into said weigh-hopper, means for comparing the resistance values of said master-potentiometer and fixed resistance means, means for opening the valve means for its said weigh-hopper when said master-control switch is closed, and valve-closure means actuated by said comparing means for closing said valve means, to stop the flow of material into said weigh-hopper when the comparison of said resistance values indicates that the predetermined weight has been weighed out; said aggregates-circuit comprises a single master-potentiometer means connected to said scale-means on said aggregates weigh-hopper; a plurality of weight-setting adjustable fixed-resistance means, one for each aggregate and its weigh-hopper; single comparing means for comparing the resistance value of said single master-potentiometer means with any of said fixed-resistance means; means for closing an open valve-means for an aggregate weighing-hopper when a comparison of resistances indicates that its weigh-hopper has had a predetermined amount weighed out; and step-switch means for automatically and sequentially opening one-at-a-time said valve-means for a said aggregate-weighing hopper at a time after said master-control switch is closed, until all said aggregates have been weighed out; and means including a pulsing relay to energize said step-switch means and operable in response to said single comparing means in said aggregates circuit.

20. In a batching plant having a plurality of weigh-hoppers to weigh out predetermined amounts of water, cement, and at least two sizes of aggregate to make up a batch of concrete, material-supply means for each weigh-hopper, valve means on each material-supply means, and scale means for each weigh-hopper; the combination of a batch selection and control mechanism comprising: a central-control circuit having a main power source and controlled by master-switch means; three separate batching-control circuits to control the weighing-out of (1) the water, (2) the cement, and (3) all the aggregates, said three circuits being connected in parallel in said central-control circuit; said water and cement control circuits each comprising: a variable-resistance means associated with a said weigh-hopper and indicator means connected to said variable-resistance means, means connected with said scale means on said weigh-hopper to move said variable-resistance means so that its resistance value is constantly proportional to the weight of material in its said weigh-hopper, adjustable fixed-resistance means, means including said indicator means to adjust said fixed-resistance means to a pre-set value corresponding to a predetermined weight of material to be weighed into said weigh-hopper, means for comparing the resistance values of said variable and fixed resistance means, means for opening the valve means for its said weigh-hopper when said master-control switch is closed, and valve closure means actuated by said comparing means for closing said valve-means to stop the flow of material into said weigh-hopper when the comparison of said resistance values indicates that the predetermined weight has been weighed out; said aggregates-circuit, comprising a variable resistance means connected to said dial-scale means on said aggregates' weigh-hopper; a plurality of weight-setting adjustable fixed-resistance means, one for each aggregate and its weigh-hopper; single comparing means for comparing the resistance value of said single variable resistance means with any of said fixed-resistance means; means for closing an open valve-means for an aggregate weighing-hopper when a comparison of resistances indicates that its weigh-hopper has had a predetermined amount weighed out; and sequence means for opening one-at-a-time said valve means for a said aggregate weighing hopper at a time after said master-control switch is closed, until all said aggregates have been weighed out; and moisture compensation means in said aggregates' circuit comprising a voltage-regulating means pre-settable to a predetermined value of percentage-moisture-content in each said aggregate to provide automatically a correction to the aggregate-batching circuit to increase the amount of aggregate weighed out and also connected to said comparing means in said water-circuit to provide a correction resulting in a decrease of the amount of water to be weighed out.

21. The batching plant described in claim 20, wherein said moisture-compensation means comprises a first multiplying-transformer adapted to receive an input through said fixed-resistance means in said aggregate-circuit and having a series of taps providing increments in increased voltage output proportional to percentage variations in aggregate moisture-content; selector-switch means to connect to any one of said taps to vary the output of said transformer according to the known percentage of moisture in the aggregate; said transformer-output being connected to said single resistance-comparing means in said aggregate-batching circuit to cause the weighing-out of an increased amount of aggregate having the moisture content; a second multiplying-transformer having its primary connected in said output of said first multiplying transformer and having its secondary connected to said resistance comparing-means in said water-batching circuit; whereby the voltage output from said second transformer is electrically opposed to the voltage input to said comparing means in said water-control circuit to thus effect a subtraction of the amount of water included as moisture in the aggregate.

22. The device described in claim 20 including means in each batching-control circuit to compensate for the material still in the air between each weigh-hopper and its material-supply means when the material cutoff-valve is closed, comprising: a voltage adjusting means in each of said batching circuits between said power supply and said resistance-comparing means and in series with said adjustable fixed-resistance means.

23. The batching plant of claim 20 including a single-control transformer means connected between said power source and all of said fixed-resistance means to simultaneously vary the value of each said fixed-resistance while maintaining a constant proportion between them, so as to change the size of the batch without changing its formula.

24. In a batching plant having a plurality of weigh-hoppers to weigh out predetermined amounts of water, cement, and at least two sizes of aggregate to make up a batch of concrete, material-supply means for each weigh-hopper, valve means on each material-supply means, and a dial-scale means for each weigh-hopper having a shaft that rotates in proportion to the weight of material in its weigh-hopper; the combination of a batch-selection-and-control mechanism comprising: a central-control circuit having a main power source and controlled by master-switch means; separate batching-control circuits to control the weighing-out of (1) the water, (2) the cement, and (3) all the aggregates, said separate circuits being connected in parallel in said central-control circuit; a plurality of sets of adjustable fixed-resistance means, representing a particular batch formula having predetermined amounts of each ingredient, means to connect any one of said sets of resistances to said separate batching-control circuit at one time; said water and cement control-circuits each having variable-resistance means associated with a said weigh-hopper and means connected with said dial-scale means on said weigh-hopper to move said variable-resistance means so that its resistance value is constantly proportional to the weight of material in its said weigh-hopper; a drum indicator mechanically connected to said variable resistance means; means to connect an adjustable fixed-resistance means from a selected said set of resistance means to said power source and means for use with said drum indicator to adjust said fixed-resistance means to a pre-set value corresponding to a predetermined weight of material to be weighed into said weigh-hopper, means for comparing the resistance values of said variable and fixed resistance means, means for opening the valve means for its said weigh-hopper when said master-switch means is closed, and valve-closure means actuated by said comparing means for closing said valve-means to stop the flow of material into said weigh-hopper when the comparison of said resistance values indicates that the predetermined weight has been weighed out; said aggregates-circuit comprising a single variable-resistance means connected to said dial-scale means on the aggregates weigh-hopper; a single drum indicator; a plurality of weight-setting adjustable fixed-resistance means in each of said sets of fixed-resistance means, one resistance means for each aggregate in each said set; single comparing means for comparing the resistance value of said single variable-resistance means with each of said selected fixed-resistance means one at a time; means for opening one said valve-means for one only of said aggregate-material supply means after said master-switch means is closed; means for closing the open valve-means when a comparison of resistances indicates that the aggregates' weigh-hopper has had a predetermined amount weighed out, and means for then actuating the valve-opening means to open the valve for the next aggregate-material supply means, until all said aggregates have been weighed out.

25. In a weighing apparatus having a weigh hopper with material supply means for feeding said weigh hopper and a valve for controlling the flow of material from said supply means; the combination comprising: an electrical circuit having a power source and control switch means; shaft means mechanically connected to said weigh hopper and means for rotating said shaft means an amount proportional to the weight of material in said weigh hopper; a master-potentiometer means; servo-drive means connectible with said shaft means on said weigh hopper for moving said master-potentiometer means so that its resistance value is proportional to the weight of material in said weigh hopper when said control switch means is in the batch position; an indicator drum means mechanically connected to said master-potentiometer means; an adjustable weight setting potentiometer means in said electrical circuit and connectible with said servo-drive means when said control switch means is in the weight setting position and operable with said indicator means for setting the resistance of the adjustable potentiometer means at a value corresponding to a predetermined weight of material to be weighed into said weigh hopper; means for opening the valve in said supply means for said weigh hopper when said control switch is moved to the batch position, thereby starting a flow of material into said weigh hopper and also starting the rotation of said indicator drum and said master-potentiometer means; and control means in said electrical circuit responsive to electrical signals from said master-potentiometer and said adjustable potentiometer for closing said valve to stop the flow of material into said weigh hopper.

26. In a weighing apparatus having a weigh-hopper with material supply means for feeding said weigh-hopper and a valve for controlling the flow of material from said supply means, the combination comprising: an electrical circuit having a power source and control switch means; a shaft mechanically connected to said weigh-hopper and linkage means for rotating said shaft an amount proportional to the weight of material in said weigh-hopper; a master potentiometer and indicator means mechanically connected thereto; servo-drive means including a servo transmitter connected to said shaft and a servo transformer electrically connected to said transmitter and to said control switch means, a servo amplifier connected to said switch means and to a servo motor, said motor being mechanically connected to said servo transmitter and said master potentiometer; an adjustable weight-setting potentiometer in said electrical circuit connectible with said servo amplifier when said control switch means is in the weight-setting position and thereby operable with said indicator means for setting the resistance of the adjustable potentiometer means at a value corresponding to a predetermined weight of material to be weighed into said weigh-hopper; means for opening the valve in said supply means for said weigh-hopper when said control switch is moved to the batch position, thereby starting a flow of material into said weigh-hopper and causing said master potentiometer means to be actuated so that its value is proportional to the weight of the material in said weigh-hopper; and control means in said electrical circuit responsive to electrical signals from said master potentiometer and said adjustable potentiometer for closing said valve to stop the flow of material into said weigh-hopper.

References Cited by the Examiner

UNITED STATES PATENTS

| | | | |
|---|---|---|---|
| 2,417,098 | 3/1947 | Wilcox | 235—180 |
| 2,584,809 | 2/1952 | Oberlin | 235—180 |
| 2,918,246 | 12/1959 | Bell | 177—70 |
| 2,938,701 | 5/1960 | Thorsson et al. | 177—70 |
| 2,969,468 | 1/1961 | Hogue | 307—88.5 |
| 2,974,237 | 3/1961 | Ehret | 307—88.5 |
| 2,982,368 | 5/1961 | McMahon | 177—70 |
| 3,002,575 | 10/1961 | Appel | 177—70 |
| 3,034,590 | 5/1962 | Noble | 177—70 |
| 3,035,648 | 5/1962 | Williams | 177—210 X |
| 3,081,830 | 3/1963 | Spademan | 177—70 |
| 3,106,974 | 10/1963 | Williams | 177—70 |
| 3,173,505 | 3/1965 | Thorsson et al. | 177—70 |

FOREIGN PATENTS 846,717   8/1960   Great Britain.

LOUIS J. CAPOZI, *Primary Examiner.*

LEONARD FORMAN, LEO SMILOW, *Examiners.*